United States Patent
Yang et al.

(10) Patent No.: US 10,782,815 B1
(45) Date of Patent: Sep. 22, 2020

(54) ELECTRONIC PANEL

(71) Applicant: Samsung Display Co., Ltd., Yongin-si (KR)

(72) Inventors: Sung-Jin Yang, Cheonan-si (KR); Sunghee Kim, Cheonan-si (KR); Hyunsik Park, Cheonan-si (KR); Chungi You, Asan-si (KR); Changho Lee, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/688,968

(22) Filed: Nov. 19, 2019

(30) Foreign Application Priority Data

Mar. 12, 2019 (KR) .................. 10-2019-0028408

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04111* (2013.01)

(58) Field of Classification Search
CPC .................. G06F 3/0412; G06F 3/044; G06F 2203/04111
See application file for complete search history.

(56) References Cited

U.S. PATENT DOCUMENTS

| 9,537,482 B2 | 1/2017 | Huh et al. |
| 2011/0057893 A1 | 3/2011 | Kim et al. |
| 2018/0067597 A1 | 3/2018 | Kim et al. |

FOREIGN PATENT DOCUMENTS

| CN | 103080876 A | * | 5/2013 | .......... H05K 1/0296 |
| KR | 10-1082293 | | 11/2011 | |
| KR | 10-2015-0077127 | | 7/2015 | |
| KR | 10-2017-0082325 | | 7/2017 | |
| KR | 10-2018-0007049 | | 1/2018 | |
| KR | 10-2018-0027722 | | 3/2018 | |

\* cited by examiner

*Primary Examiner* — Michael Perven
(74) *Attorney, Agent, or Firm* — H.C. Park & Associates, PLC

(57) ABSTRACT

An electronic panel including a base substrate including a plurality of unit detection areas; a first detection electrode including a first connection pattern disposed in each of the unit detection areas and extending along a first direction, and a plurality of first main patterns connected to one side and the other side of the first connection pattern, respectively; a second connection pattern including a second connection pattern disposed in each of the unit detection areas and extending along a second direction intersecting the first direction, and a plurality of second main patterns connected to one side and the other side of the second connection pattern; respectively, and a plurality of coordinate patterns arranged in the unit detection areas, respectively.

20 Claims, 23 Drawing Sheets

ELECTRONIC PANEL

CROSS-REFERENCE TO RELATED APPLICATION

This application claims priority from and the benefit of Korean Patent Application No. 10-2019-0028408, filed on Mar. 12, 2019, which is hereby incorporated by reference for all purposes as if fully set forth herein.

BACKGROUND

Field

Exemplary embodiments of the invention relate generally to an electronic panel, and more particularly, to an electronic panel including a detection unit for detecting an external input.

Discussion of the Background

An electronic device is activated in response to an electrical signal. An electronic device is composed of various electronic components such as an electronic panel and an electronic module. The electronic panel may include a display unit for displaying an image or a detection unit for detecting an external input. The electronic components are electrically interconnected by variously arranged signal lines.

The display unit includes a light emitting element for generating an image. The detection unit may include detection electrodes for detecting an external input. The detection unit is designed to provide uniform sensitivity over the entire area where the detection electrodes are disposed. In the electronic panel manufacturing process, various inspection operations may be performed to determine whether defects are generated in each of the display unit and the detection unit, and for electrical evaluation.

The above information disclosed in this Background section is only for understanding of the background of the inventive concepts, and, therefore, it may contain information that does not constitute prior art.

SUMMARY

Exemplary embodiments of the present invention provide an electronic panel capable of reducing the inspection time of a detection unit and reducing the processing cost.

Additional features of the inventive concepts will be set forth in the description which follows, and in part will be apparent from the description, or may be learned by practice of the inventive concepts.

An exemplary embodiment of the present invention provides an electronic panel including: a base substrate including a plurality of unit detection areas; a first detection electrode including a first connection pattern disposed in each of the unit detection areas and extending along a first direction, and a plurality of first main patterns connected to one side and the other side of the first connection pattern, respectively; a second detection electrode including a second connection pattern disposed in each of the unit detection areas and extending along a second direction intersecting the first direction, and a plurality of second main patterns connected to one side and the other side of the second connection pattern, respectively; and a plurality of coordinate patterns arranged in the unit detection areas, respectively. Each of the coordinate patterns includes: a plurality of first patterns, each having a first area; and a second pattern spaced apart from the first patterns and including a second area different from the first area, and each of the first patterns matches with the second pattern.

A difference between a maximum diagonal length of each of the first patterns and a maximum diagonal length of the second pattern may be less than or equal to 2 µm.

The first connection pattern and the second connection pattern may be spaced apart from each other with an insulating layer therebetween, and each of the first patterns and the second pattern may include through-holes passing through the insulating layer.

The first connection pattern may include: a first connection part disposed on a different layer from the second connection pattern; a second connection part disposed on a different layer from the second connection pattern and spaced apart from the first connection part; and an island part disposed between the first connection part and the second connection part and disposed on the same layer as the second connection pattern and spaced apart from the second connection pattern on a plane. Each of the first connection part and the second connection part may be connected to the island part through the insulating layer.

The island part may be disposed in an opening part passing through the second connection pattern or the second main pattern, and may be spaced apart from the second connection pattern or the second main pattern in a plan view.

The coordinate pattern may be disposed on the island part.

The first and second connection parts and the island part may include different materials from each other.

The first patterns and the second pattern may include through-holes passing through any one of the first connection pattern, the second connection pattern, the first main patterns, and the second main patterns.

Each of the coordinate patterns may include: a first group of hole patterns including a plurality of hole patterns spaced apart from each other along one direction; and a second group of hole patterns spaced apart from each other in a direction different from the one direction and spaced apart from the first group of hole patterns. One of the first group of hole patterns may include the second pattern and the remaining of the first group of hole patterns may include the first patterns.

The first group of hole patterns may surround an edge of the second group of hole patterns.

The first group of hole patterns have different shapes from shapes of the second group of hole patterns.

The first group of hole patterns have different sizes from sizes of the second group of hole patterns.

The number of the first group of hole patterns and the number of the second group of hole patterns may be different from each other.

The positions of the second patterns of the unit detection areas may be different from each other.

Another exemplary embodiment of the present invention provides an electronic panel including: a first detection electrode including a first connection pattern, and a plurality of first main electrodes spaced apart from each other with the first connection pattern therebetween and each connected to the first connection pattern; a second detection electrode including a second connection pattern spaced apart from the first connection pattern with an insulating layer therebetween, and a plurality of second main patterns spaced apart from each other with the second connection pattern therebetween and each connected to the second connection pattern; and a coordinate pattern disposed on the first detection electrode. The first connection pattern includes an island part spaced apart from the first main patterns, a first connection part connecting one of the first main patterns and the island part, and a second connection part connecting another of the first main patterns and the island part, and the coordinate pattern is disposed on the island part.

The island part may be disposed on the same layer as the second detection patterns and spaced apart from the second connection patterns and the second main patterns on a plane.

The coordinate pattern may include: a plurality of first patterns, each having a first area; and a second pattern spaced apart from the first patterns, each pattern having a second area different from the first area. Each of the first patterns may match with the second pattern.

The coordinate patterns may include a plurality of through-holes passing through the insulating layer, and the island part may have an upper surface curved along the through-holes.

The coordinate patterns may include a plurality of through-holes passing through the island part.

The coordinate patterns may have different numerical shapes from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
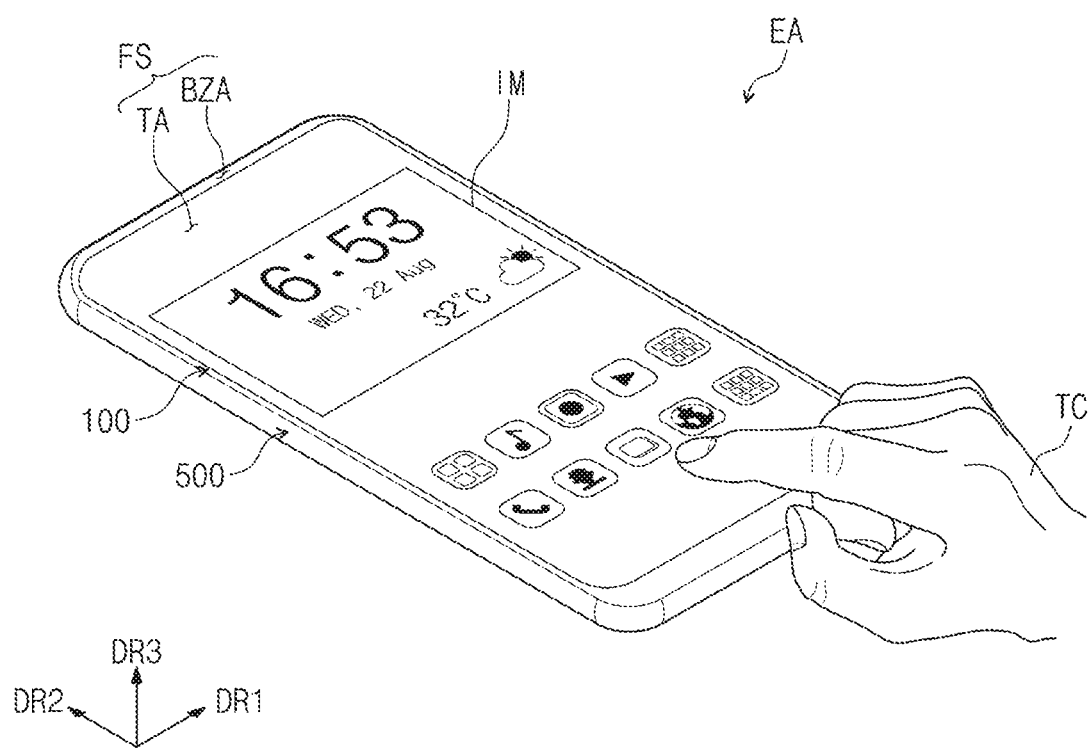
FIG. 1A is an assembled perspective view of an electronic device according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
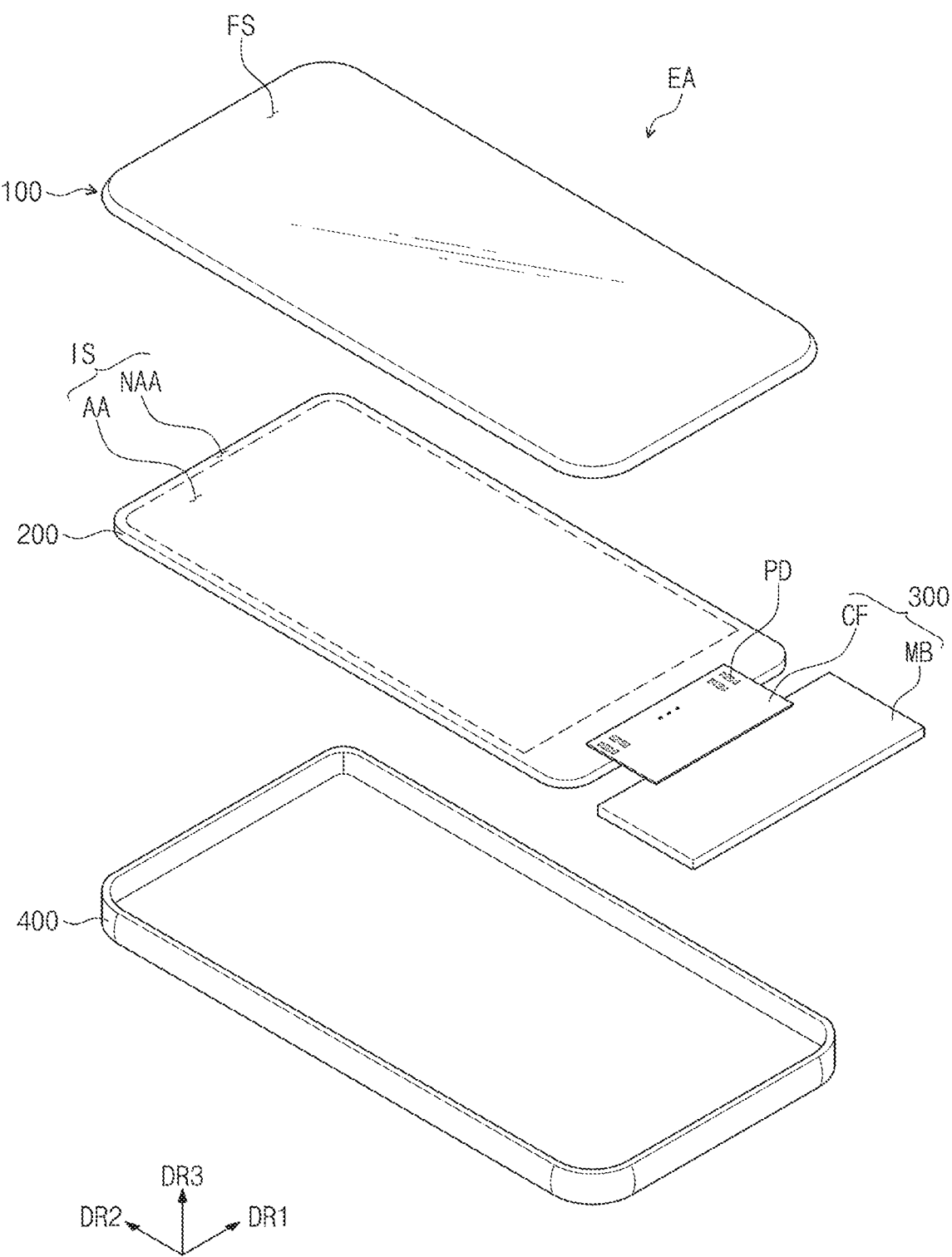
FIG. 1B is an exploded perspective view of the electronic device shown in FIG. 1A.

FIG. 1A is an assembled perspective view of an electronic device according to an exemplary embodiment of the present invention. FIG. 1B is an exploded perspective view of the electronic device shown in FIG. 1A. Hereinafter, the inventive concepts will be described with reference to FIGS. 1A and 1B.

An electronic device EA may be a device that is activated in response to an electrical signal. The electronic device EA may include various exemplary embodiments. For example, the electronic device EA may include a tablet, a notebook, a computer, a smart television, and the like. In this embodiment, the electronic device EA is exemplarily shown as a smart phone.

As shown in FIG. 1, the electronic device EA may display the image IM on the front surface FS. The front surface FS may be defined as being parallel to a plane defined by the first direction DR1 and the second direction DR2.

The electronic device EA displays an image IM. The image IM may include at least one of a static image and a dynamic image. In FIG. 1, a clock and a plurality of icons are shown as an example of the image IM.

A direction normal to the front surface FS may correspond to the thickness direction DR3 (hereinafter referred to as a third direction) of the electronic device EA. In the present exemplary embodiment, the front surface (or upper surface) and the back surface (or lower surface) of each member are defined with reference to the direction in which the image IM is displayed. The front surface and the back surface are opposed to each other in the third direction DR3.

Moreover, the directions that the first to third directions DR1, DR2, and DR3 indicate may be converted to other directions as a relative concept. Hereinafter, first to third directions as directions that the respective first to third directions DR1, DR2, and DR3 indicate refer to the same reference numerals.

The electronic device EA according to the inventive concepts may detect an input TC of a user applied from the outside. The user's input TC includes various types of external inputs such as a part of the user's body, light, heat, or pressure. In addition, the electronic device EA may detect inputs that contact and also non-contact inputs that are close to or adjacent to the electronic device EA.

In this exemplary embodiment, the user's input TC is shown with the user's hand applied to the front surface. However, this is illustrated by way of example, and as described above, the user's input TC may be provided in various forms. In addition, the electronic device EA may detect a user's input TC applied to the side surface or back surface of the electronic device EA according to the structure of the electronic device EA and is not limited to any one exemplary embodiment.

The electronic device EA may include a window 100, an electronic panel 200, a circuit board 300, and an external case 400, as shown in FIG. 1B. The window 100 and the outer case 400 are combined to define the appearance of the electronic device EA.

The window 100 is disposed on the electronic panel 200 to cover the upper surface IS of the electronic panel 200. The window 100 may include an optically transparent electrically insulating material. The electronic panel 200 may display the image IM and detect the external input TC. The electronic panel 200 includes an upper surface IS including an active area AA and a peripheral area NAA. The active area AA may be an area activated according to an electrical signal.

In the present exemplary embodiment, the active area AA is an area where the image IM is displayed, and an area where the external input TC is detected. However, this is merely an example, and the area where the image IM is displayed in the active area AA and the area where the external input TC is detected may be separated from each other, and is not limited to any one exemplary embodiment.

The peripheral area NAA may be an area covered by the bezel area BZA. The peripheral area NAA is adjacent to the active area AA. The peripheral area NAA may surround the active area AA. A driving circuit, a driving wiring, and the like for driving the active area AA may be disposed in the peripheral area NAA.

In the peripheral area NAA, various signal lines, pads PD, or electronic devices for providing an electrical signal to the active area AA may be disposed. The peripheral area NAA may be covered by the bezel area BZA and not be visible from the outside.

In this exemplary embodiment, the electronic panel 200 is assembled in a flat state in which the active area AA and the peripheral area NAA face the window 100. However, this is merely an example, and a portion of the peripheral area NAA or a portion of the active area AA of the electronic panel 200 may be bent.

When a portion of the electronic panel 200 is bent, a portion of the peripheral area NAA is directed to the back surface of the electronic device EA, so that the bezel area BZA at the front surface of the display device EA may be reduced. Alternatively, the electronic panel 200 may be assembled in a state where a portion of the active area AA is also bent. Alternatively, in the electronic panel 200 according to the inventive concepts, the peripheral area NAA may be omitted.

The circuit board 300 may be connected to the electronic panel 200. The circuit board 300 may include a flexible substrate CF and a main substrate MB. The flexible substrate CF may include an insulating film and conductive wires mounted on the insulating film. The conductive wires are connected to the pads PD to electrically connect the circuit board 300 and the electronic panel 200.

In this exemplary embodiment, the flexible substrate CF may be assembled in a bent state. Accordingly, the main substrate MB is disposed on the back surface of the electronic panel 200 so that it may be received stably in the space provided by the outer case 400. However, the flexible substrate CF may be omitted, and the main substrate MB may be directly connected to the electronic panel 200 at this time.

The main substrate MB may include signal lines and electronic elements not shown. The electronic elements may be connected to the signal lines and electrically connected to the electronic panel 200.

In an electronic device EA according to an exemplary embodiment of the present invention, the driving circuit for providing an electric signal to the active area AA may be directly mounted on the electronic panel 200. At this time, the driving circuit may be mounted in the form of a chip, or may be formed together with the pixels PX. At this time, the area of the circuit board 300 may be reduced or omitted. The electronic device EA of the inventive concepts may include various embodiments and is not limited to any one specific exemplary embodiment.

Figure 2A:
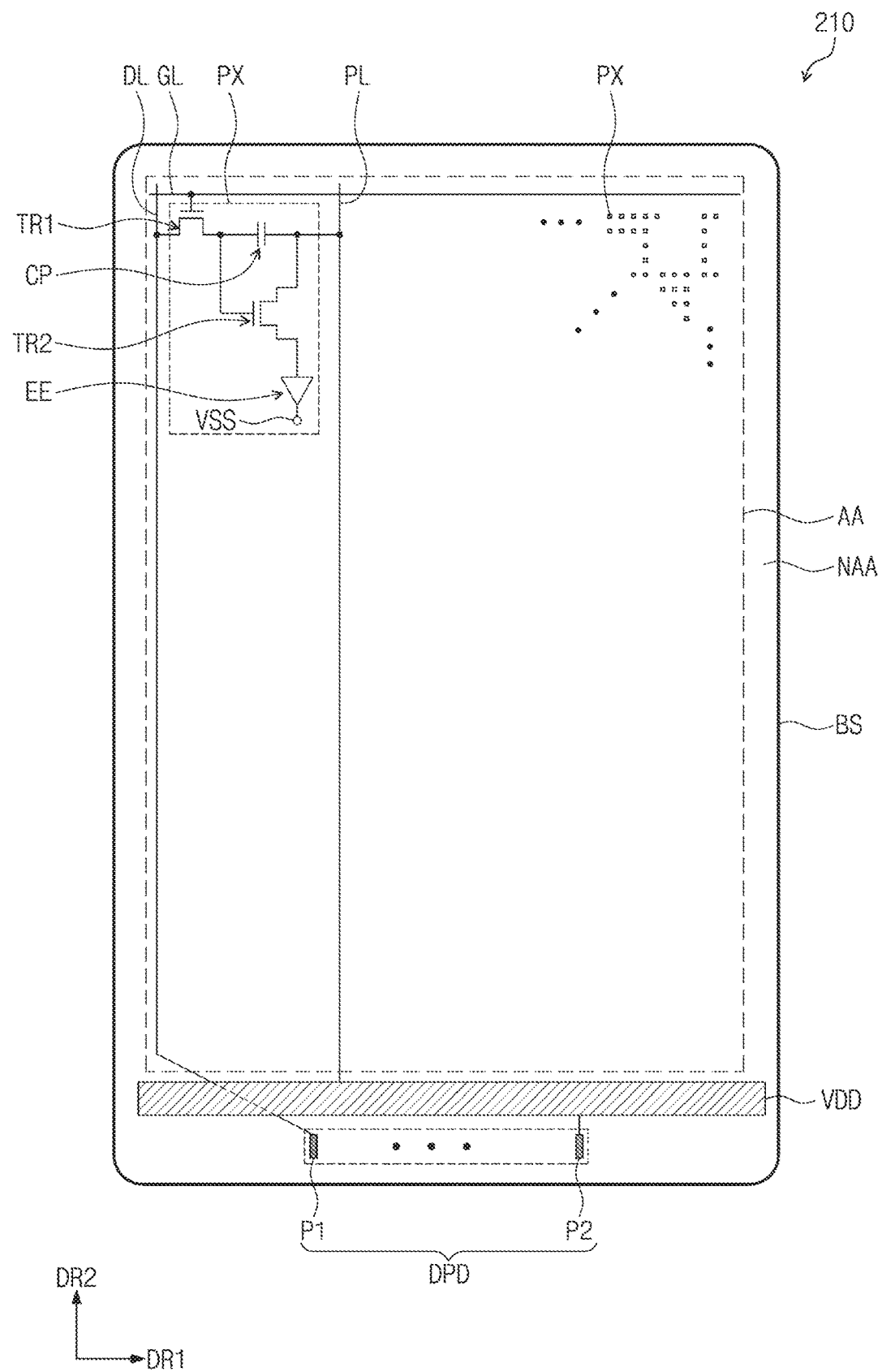
FIGS. 2A and 2B are views of respective some configurations of the electronic device shown in FIG. 1B.
Figure 2B:
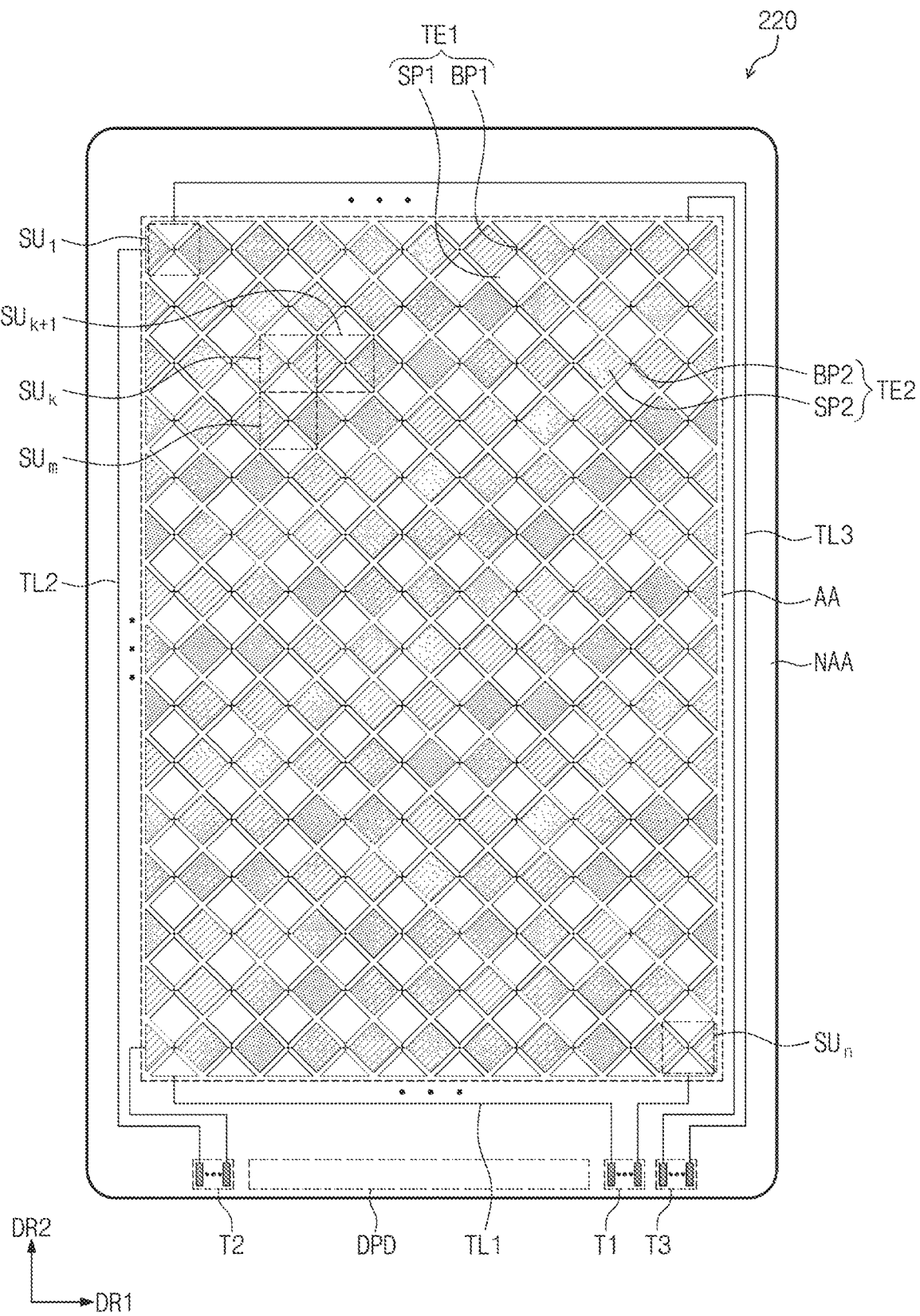
Figure 3A:
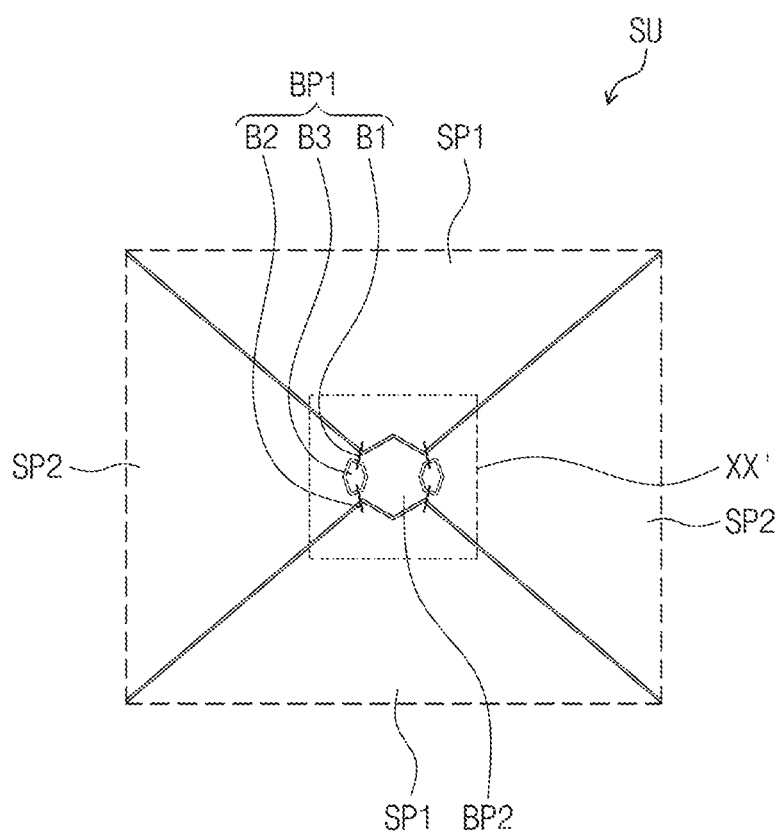
FIG. 3A is an enlarged plan view showing a portion of an electronic device according to an exemplary embodiment of the present invention.
Figure 3B:
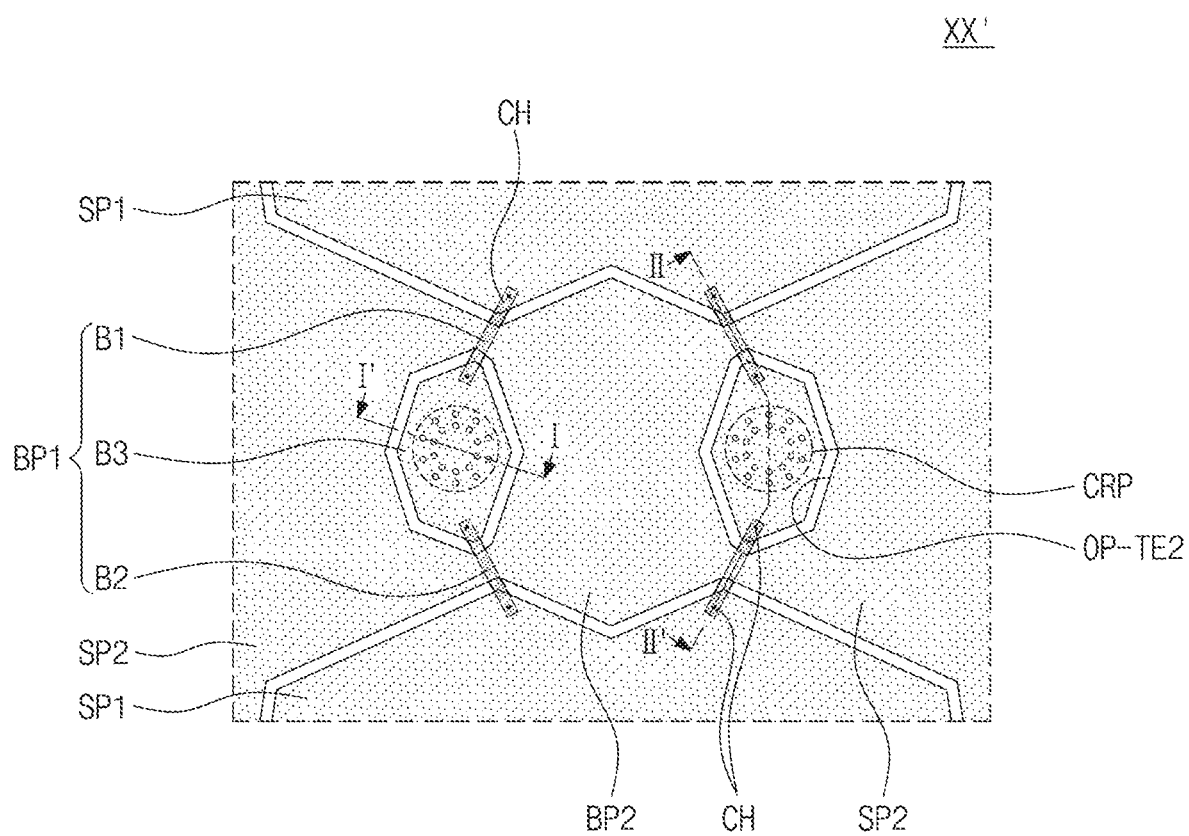
FIG. 3B is an enlarged plan view of the area XX' shown in FIG. 3A.

FIGS. 2A and 2B are views of some configurations of the electronic device shown in FIG. 1B. FIG. 3A is an enlarged plan view showing a portion of an electronic device according to an exemplary embodiment of the present invention. FIG. 3B is an enlarged plan view of the area XX' shown in FIG. 3A. Hereinafter, the inventive concepts will be described with reference to FIGS. 2A to 3B.

FIG. 2A shows a plan view of the display unit 210 which is a constitution of the electronic panel 200 (see FIG. 1B), and FIG. 2B shows a plan view of the detection unit 220 which is a constitution of the electronic panel 200. In this exemplary embodiment, the detection unit 220 is shown disposed on the display unit 210. However, this is merely an example, and the detection unit 220 may be disposed on the lower side of the display unit 210, or may be built in the display unit 210, and is not limited to any one specific exemplary embodiment.

The display unit 210 is configured to substantially generate the image IM (see FIG. 1A). The user views the image IM generated by the display unit 210 from the outside through the window 100.

The display unit 210 includes a base substrate BS, a plurality of pixels PX, a plurality of signal lines GL, DL and PL, and a plurality of display pads DPD. The active area AA and the peripheral area NAA may be areas provided by the base substrate BS. The base substrate BS may include an insulating substrate. For example, the base substrate BS may be composed of a glass substrate, a plastic substrate, or a combination thereof.

The signal lines GL, DL and PL are connected to the pixels PX to transmit electrical signals to the pixels PX. A scan line GL, a data line DL, and a power supply line PL among the signal lines are included in the display unit 210. However, this is merely an example. The signal lines GL, DL, and PL may further include at least one of a power supply line, an initialization voltage line, and a light emission control line, and is not limited to any one specific exemplary embodiment.

The pixel PX may be disposed in the active area AA. In this exemplary embodiment, a signal circuit diagram of one pixel PX among a plurality of pixels is enlarged and shown as an example. The pixel PX may include a first thin film transistor TR1, a capacitor CP, a second thin film transistor TR2, and a light emitting element EE.

The light emitting element EE may generate light or control the amount of light according to an electrical signal. For example, the light emitting element EE may include an organic light emitting element, a quantum dot light emitting element, an electrophoretic element, or an electrowetting element. However, this is merely an example, and each of the pixels PX may include electronic components having various configurations and arrangements, and is not limited to any one specific exemplary embodiment.

The power supply pattern VDD is disposed in the peripheral area NAA. In this exemplary embodiment, the power supply pattern VDD is connected to a plurality of power supply lines PL. Thus, as the display unit 210 includes the power supply pattern VDD, it may provide the same power supply signal to a plurality of pixels.

The display pads DPD may include a first pad P1 and a second pad P2. The plurality of first pads P1 may be connected to the data lines DL, respectively. The second pad P2 may be connected to the power supply pattern VDD and electrically connected to the power supply line PL. The display unit 210 may provide electrical signals to the pixels PX externally provided through the display pads DPD. The display pads DPD may further include pads for receiving electrical signals other than the first pads P1 and the second pads P2, and are not limited to any one exemplary embodiment.

Referring to FIG. 2B, the detection unit 220 is disposed on the display unit 210. The detection unit 220 may detect the external input TC (see FIG. 1A) and obtain the position and intensity information of the external input TC. The detection unit 220 includes a plurality of first detection electrodes TE1, a plurality of second detection electrodes TE2, a plurality of lines TL1, TL2 and TL3, and a plurality of detection pads T1, T2, and T3.

The first detection electrodes TE1 and the second detection electrodes TE2 are disposed in the active area AA. The detection unit 220 may obtain information on the external input TC through a change in capacitance between the first detection electrodes TE1 and the second detection electrodes TE2. However, this is merely an example, and the detection unit 220 may be driven by a resistance film type to obtain information on the external input TC, and is not limited to any one specific exemplary embodiment.

The first detection electrodes TE1 are arranged along the first direction DR1 and each of them extends along the second direction DR2. Each of the first detection electrodes TE1 includes a plurality of first main patterns SP1, and a first connection pattern BP1 connecting adjacent first main patterns SP1.

The first main pattern SP1 is disposed in the active area AA. The first main pattern SP1 has a predetermined shape and has a first area. In this exemplary embodiment, the first main pattern SP1 may have a shape substantially similar to a rhombus shape. However, this is merely an example, and the first main pattern SP1 may have various shapes and is not limited to any one specific exemplary embodiment.

The first connection pattern BP1 extends along the second direction DR2. The first connection pattern BP1 is connected to the first main pattern SP1. The first connection pattern BP1 may be disposed between the two first main patterns to connect the two first main patterns.

The second detection electrodes TE2 are arranged along the second direction DR2 and each of them extends along the first direction DR1. Each of the second detection electrodes TE2 may include a second main pattern SP2 and a second connection pattern BP2.

The second main pattern SP2 is disposed in the active area AA. The second main pattern SP2 may be physically spaced apart from the first main pattern SP1. In this exemplary embodiment, the separation between the first main pattern SP1 and the second main pattern SP2 may be a separation on the cross section. The first main pattern SP1 and the second main pattern SP2 are not in contact with each other and may transmit and receive independent electrical signals.

In this exemplary embodiment, the second main pattern SP2 may have the same shape as the first main pattern SP1. For example, the second main pattern SP2 may have a relatively rhombic shape. However, this is merely an example, and the second main pattern SP2 may have various shapes and is not limited to any one specific exemplary embodiment.

In this exemplary embodiment, the second connection pattern BP2 extends along the first direction DR1. The second connection pattern BP2 is connected to the second main pattern SP2. The second connection pattern BP2 may be disposed between the two second main patterns to connect the two second main patterns.

The detection lines TL1, TL2, and TL3 are disposed in the peripheral area NAA. The detection lines TL1, TL2 and TL3 may include first detection lines TL1, second detection lines TL2 and third detection lines TL3.

The first detection lines TL1 are connected to the first detection electrodes TE1, respectively. In this exemplary embodiment, the first detection lines TL1 are connected to the upper ends of the both ends of the first detection electrodes TE1, respectively.

The second detection lines TL2 are connected to one ends of the second detection electrodes TE2, respectively. In this exemplary embodiment, the second detection lines TL2 are connected to the left ends of the both ends of the second detection electrodes TE2, respectively.

The third detection lines TL3 are connected to the lower ends of the both ends of the first detection electrodes TE1, respectively. According to an exemplary embodiment, the first detection electrodes TE1 may be connected to the first detection lines TL1 and the third detection lines TL3, respectively. Accordingly, for the first detection electrodes TE1 having a relatively longer length compared to the second detection electrodes TE2, the sensitivity according to the area may be maintained uniformly. On the other hand, this is merely an example, and in the detection unit 220 according to an exemplary embodiment of the present invention, the third detection lines TL3 may be omitted and are not limited to any one specific exemplary embodiment.

The detection pads TPD are disposed in the peripheral area NAA. The detection pads T1, T2, and T3 may include first detection pads T1, second detection pads T2, and third detection pads T3. The first detection pads T1 are respectively connected to the first detection lines TL1 to provide an external signal to the first detection electrodes TEL The second detection pads T2 are respectively connected to the second detection lines TL2, and the third detection pads T3 are respectively connected to the third detection lines TL3 to electrically connect to the second detection electrodes TE2.

In the detection unit 220 according to an exemplary embodiment of the present invention, the active area AA may include a plurality of n unit detection areas $SU_1$, $SU_k$, $SU_{k+1}$, $SU_m$, and $SU_n$. Each of the unit detection areas $SU_1$, $SU_k$, $SU_{k+1}$, $SU_m$, and $SU_n$ may be a minimum unit area where an external input TC may be detected. For example, each of the unit detection areas $SU_1$, $SU_k$, $SU_{k+1}$, $SU_m$, and $SU_n$ may be shown as an area including a half area of the area of the two first main patterns SP1 around the first and second connection patterns CP1 and CP2 and a half area of the area of the two second main patterns SP2. The unit detection areas $SU_1$, $SU_k$, $SU_{k+1}$, $SU_m$, and $SU_n$ are arranged side-by-side on a plane. For ease of explanation, in FIG. 2B, some unit detection areas $SU_1$, $SU_k$, $SU_{k+1}$, $SU_m$, and $SU_n$ of the detection areas SU are shown by dotted lines.

The unit detection areas $SU_1$, $SU_k$, $SU_{k+1}$, $SU_m$, and $SU_n$ may be arranged along a row defined by the first direction DR1 and a column defined by the second direction DR2. Accordingly, the first unit detection area $SU_1$ of the unit detection areas $SU_1$, $SU_k$, $SU_{k+1}$, $SU_m$, and $SU_n$ may be disposed in the first row and the first column, and the last n-th unit detection area $SU_n$ may be disposed in the last row and the last column.

Referring to FIGS. 3A and 3B, the first connection pattern BP1 and the second connection pattern BP2 are disposed to intersect with each other. In this exemplary embodiment, the first connection pattern BP1 and the second connection pattern BP2 may be disposed at the center of one unit detection area SU.

The second connection pattern BP2 may have an integral shape connected to the second main pattern SP2. The second connection pattern BP2 is disposed on the same layer as the second main pattern SP2 and connects the two adjacent second main patterns SP2.

The first connection pattern BP1 connects between two adjacent first main patterns SP1. In this exemplary embodiment, the first main patterns SP1 may be disposed apart from each other on a plane with the second connection pattern BP2 therebetween.

The first connection pattern BP1 may include a first connection part B1, a second connection part B2, and an island part B3. The first connection part B1 connects the island part B3 and the upper first main pattern SP1. The second connection part B2 connects the island part B3 and the lower first main pattern SP1. The first connection part B1 and the second connection part B2 may be disposed on a different layer from the second main pattern SP2 and the second connection pattern BP2.

The island part B3 may be disposed on the same layer as the second main pattern SP2 and the second connection pattern BP2 and may be disposed apart from the second main pattern SP2 and the second connection pattern BP2. The island part B3 may be disposed in the opening part formed in the second main pattern SP2 or in the opening part formed in the second connection pattern BP2.

In the present exemplary embodiment, the island part B3 may be disposed in an opening part OP-TE2 defined at a position where the second main pattern SP2 and the second connection pattern BP2 are connected. A predetermined separation space GP may exist between the island part B3 and the second connection pattern BP2 and between the island part B3 and the second main pattern SP2. Accordingly, the island part B3 may be electrically insulated even if it is disposed on the same layer as the second detection electrode TE2, so that it may transmit and receive an independent electrical signal from the second detection electrode TE2.

In the electronic device according to an exemplary embodiment of the present invention, the detection unit 220 further includes a coordinate pattern CRP. The coordinate pattern CRP may be disposed in each unit detection area SU. In this embodiment, the coordinate pattern CRP is exemplarily disposed in the island part B3.

The coordinate pattern CRP represents the unique coordinate information of each unit detection area SU. A coordinate pattern CRP has a shape distinguished from a coordinate pattern constituting the coordinate pattern CRP of an adjacent unit detection area SU. According to the inventive concepts, the position of the corresponding unit detection area SU may be easily recognized by confirming the coordinate pattern CRP, so that the inspection step and the like may be simplified.

Figure 4A:
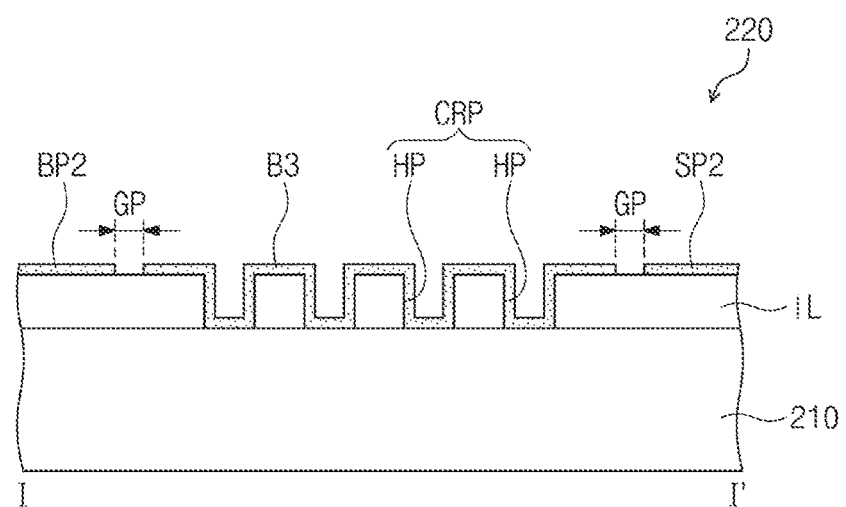
FIG. 4A is a cross-sectional view taken along the line I-I' shown in FIG. 3B.
Figure 4B:
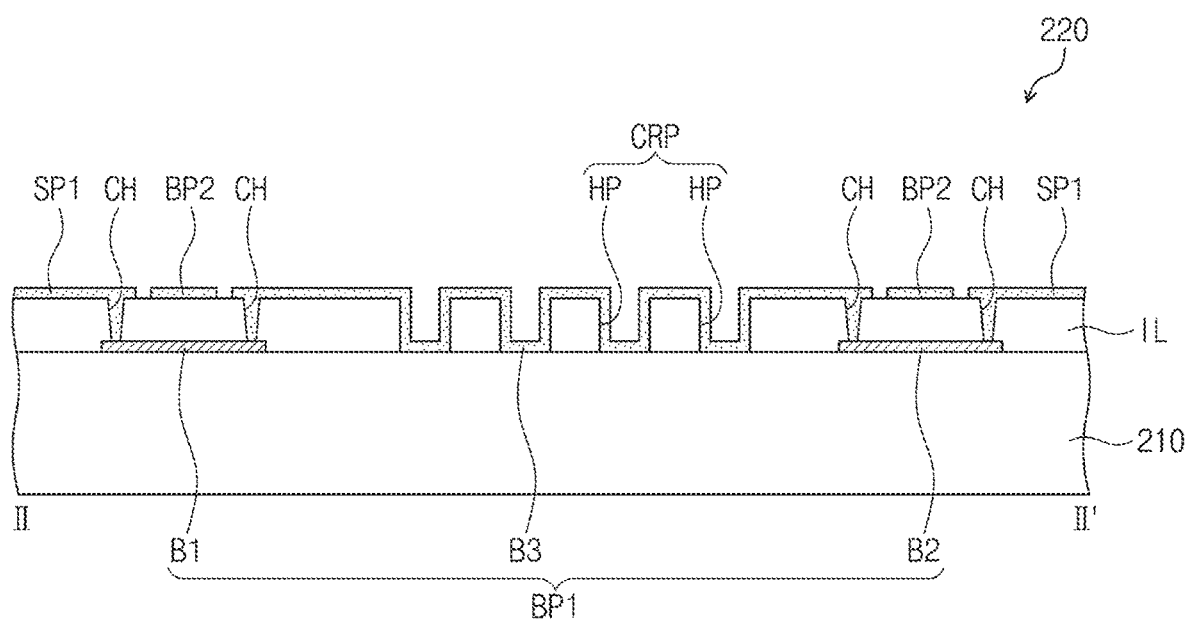
FIG. 4B is a cross-sectional view taken along the line II-II' shown in FIG. 3B.
Figure 5:
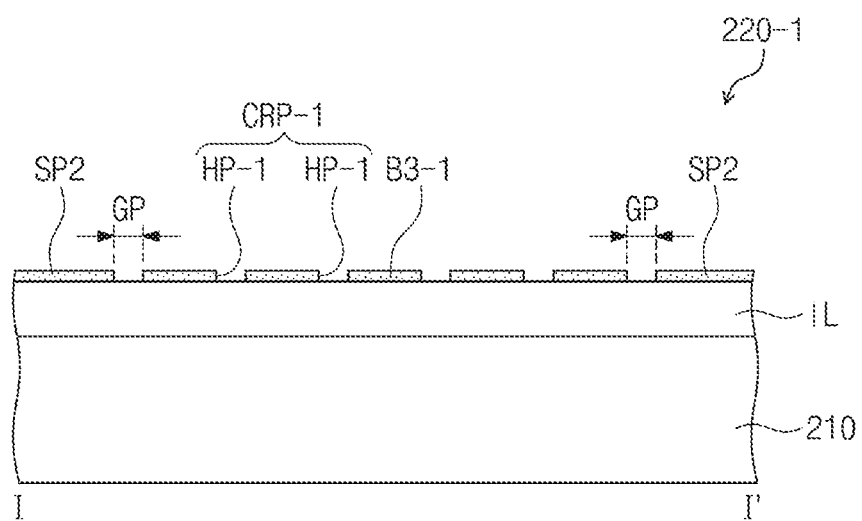
FIG. 5 is a cross-sectional view illustrating a portion of a detection unit according to an exemplary embodiment of the present invention.

FIG. 4A is a cross-sectional view taken along the line I-I' shown in FIG. 3B, and FIG. 4B is a cross-sectional view taken along the line II-If shown in FIG. 3B. FIG. 5 is a cross-sectional view illustrating a portion of a detection unit according to an exemplary embodiment of the present invention. For ease of explanation, FIG. 5 shows the area corresponding to FIG. 4A. Hereinafter, the inventive concepts will be described with reference to FIGS. 4A to 5. Moreover, the same components as those described with reference to FIGS. 1A to 3B are given by the same reference numerals and redundant description will be omitted.

As shown in FIGS. 4A and 4B, the first main pattern SP1, the second main pattern SP2, and the second connection pattern BP2 are disposed on the same layer. It is shown that the first main pattern SP1, the second main pattern SP2, and the second connection pattern BP2 are arranged on the detection insulating layer IL, and it is shown that the second connection pattern BP2 and the second main pattern SP2 are connected to each other to form an integral shape.

The first connection pattern BP1 may be electrically insulated from the second connection pattern BP2 and the second main pattern SP1. At least one of the first connection part B1, the second connection part B2, and the island part B3 constituting the first connection pattern BP1 may be disposed on a different layer from the rest of the configuration. In this exemplary embodiment, it is shown that the first connection part B1 and the second connection part B2 are arranged on the same layer and the island part B3 is disposed on a different layer.

The first connection part B1 and the second connection part B2 are disposed between the display unit 210 and the detection insulating layer IL. The first connection part B1 and the second connection part B2 are disposed on a different layer from the first main pattern SP1, the second main pattern SP2 and the second connection part B2. One side and the other side of each of the first connection part B1 and the second connection part B2 are respectively connected to the first main pattern SP1 and the island part B3 through the contact holes CH.

The island part B3 is disposed on the same layer as the first main pattern SP1, the second main pattern SP2, and the second connection pattern BP2. The island part B3 may be spaced apart from the first main pattern SP1, the second main pattern SP2 and the second connection pattern BP2 on a plane with a separation space GP therebetween.

The coordinate pattern CRP overlaps the island part B3 on a plane. The coordinate pattern CRP may represent the position value of the corresponding unit detection area, and may be a pattern with unique coordinates or address information of the corresponding unit detection area. The coordinate pattern CRP may include a plurality of hole patterns HP. The hole patterns HP are disposed apart from each other on a plane. In this exemplary embodiment, each of the hole patterns HP may be a through-hole passing through the insulating layer IL.

The island part B3 is disposed on the detection insulating layer IL along the hole patterns HP. The upper surface of the island part B3 may have a curvature corresponding to the coordinate pattern CRP. The user may view the coordinate pattern CRP through the curvature formed on the island part B3.

On the other hand, as shown in FIG. 5, the coordinate pattern CRP-1 may be defined in the island part B3-1. Each of the hole patterns HP-1 may be a through-hole passing through the island part B3-1. The user may view the coordinate pattern CRP-1 through the through-holes formed in the island part B3-1.

According to the inventive concepts, if the coordinate patterns CRP and CRP-1 may be visually recognized by the user, they may be formed by various configurations. According to the inventive concepts, by using the curvature formed in the detection electrode or the through-hole formed in the detection electrode as a coordinate pattern, each unit detection area may form unique coordinate patterns, and coordinate patterns that may be easily seen by the user may be provided.

Figure 6A:
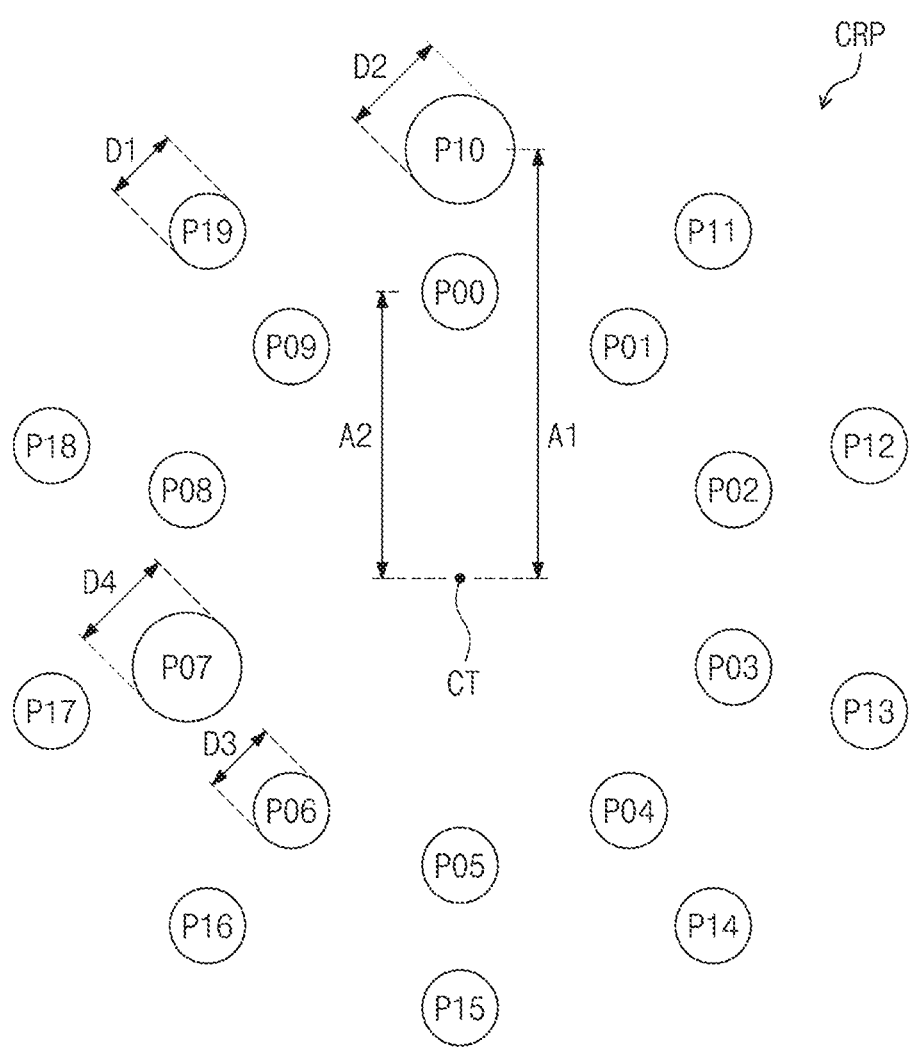
FIGS. 6A and 6B are plan views of coordinate patterns according to an exemplary embodiment of the present invention.
Figure 6B:
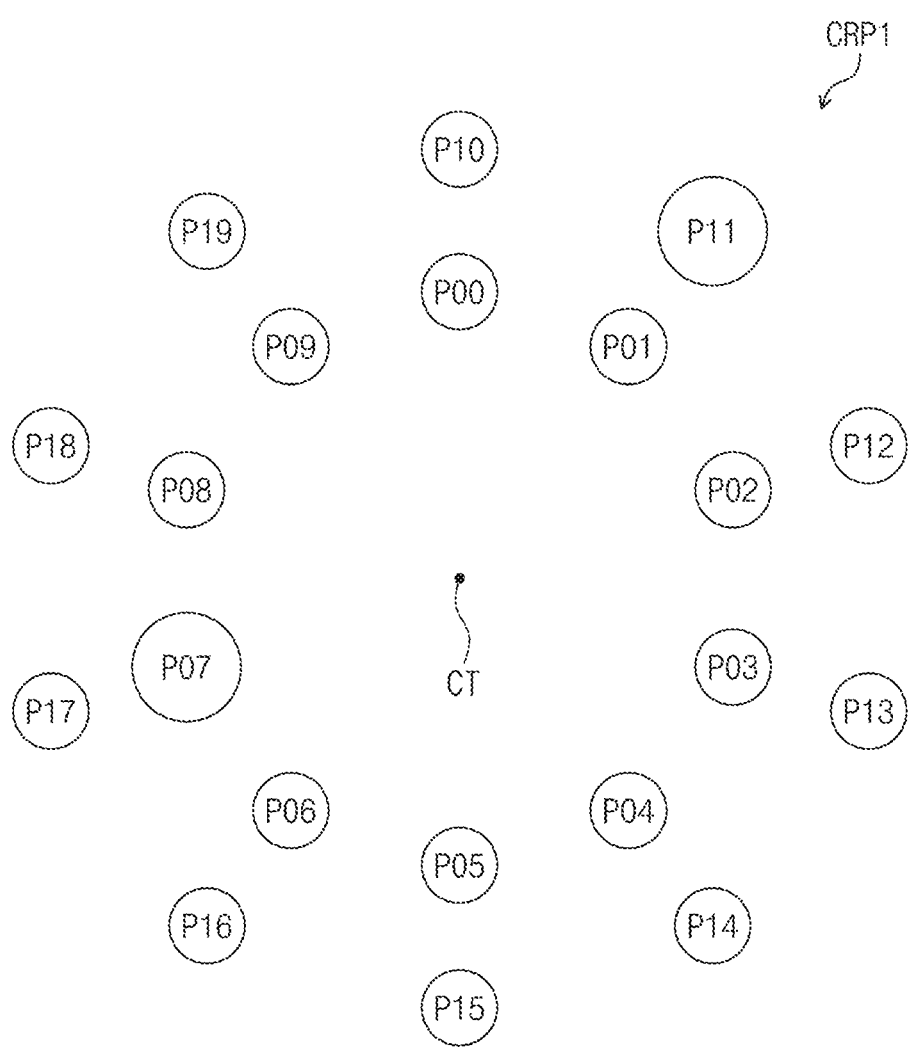
Figure 6C:
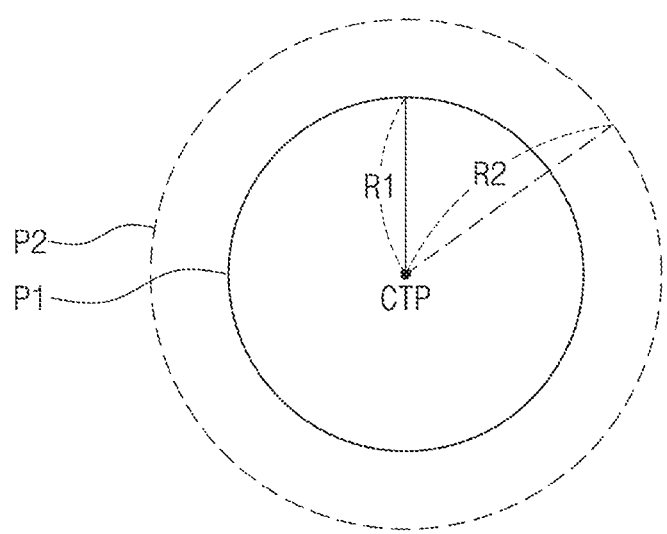
FIG. 6C is a plan view of a coordinate pattern according to an exemplary embodiment of the present invention.

FIGS. 6A and 6B are plan views of coordinate patterns according to an exemplary embodiment of the present invention. FIG. 6C is a plan view of some of coordinate patterns according to an exemplary embodiment of the present invention. For ease of explanation, FIGS. 6A and 6B show coordinate patterns of unit detection areas at different positions, and FIG. 6C shows hole patterns.

Hereinafter, the inventive concepts will be described with reference to FIGS. 6A to 6C. The same components as those described with reference to FIGS. 1A to 5 are given by the same reference numerals, and any redundant description will be omitted.

As shown in FIG. 6A, the coordinate pattern CRP may include a first group of hole patterns P10 to P19 and a second group of hole patterns P00 to P09. For ease of explanation, unique numbers P00 to P19 according to positions are shown for each hole pattern.

The first group of hole patterns P10 to P19 may be arranged along the circumference of the circle having the first radius A1 from the center CT. Of the first group of hole patterns P10 to P19, the first hole pattern P10 to the tenth hole pattern P19 may be sequentially arranged in the clockwise direction. In this exemplary embodiment, the first group of hole patterns P10 to P19 are arranged at equal intervals from each other.

The second group of hole patterns P00 to P09 are spaced apart from the first group of hole patterns P10 to P19. The second group of hole patterns P00 to P09 may be arranged along the circumference of the circle having the second radius A2 from the center CT. Of the second group of hole patterns P00 to P09, the first hole pattern P00 to the tenth hole pattern P09 may be sequentially arranged in the clockwise direction. In this exemplary embodiment, the second group of hole patterns P00 to P09 are arranged at equal intervals from each other.

In this exemplary embodiment, the second radius A2 may be smaller than the first radius A1. Accordingly, the second group of hole patterns P00 to P09 may be disposed on the inner side of the circular shape defined by the first group of hole patterns P10 to P19.

As described above, the user may know unique coordinates, that is, an address, of the corresponding unit detection area through the coordinate pattern CRP. For example, when the detection area is an N-th detection area, the first group of hole patterns P10 to P19 includes the N-tens-digit information, and the second group of hole patterns P00 to P09 may include N-unit-digit information.

The first group of hole patterns P10 to P19 include nine hole patterns P11 to P19 having the same diameter D1 and one hole pattern P10 having a relatively large diameter D2. FIG. 6A shows that the first hole pattern P10 of the first group of hole patterns P10 to P19 has a diameter D2 larger than a diameter D1 of each of the remaining hole patterns P11 to P19. Assuming that it means "0" to "9" sequentially from the first hole pattern P10 to the last hole pattern P19 in the first group of hole patterns P10 to P19, it may be seen that the first group of hole patterns P10 to P19 has information in which the number in "tens place" of N is "0".

Similarly, the second group of hole patterns P00 to P09 include nine hole patterns P00 to P06, P08 and P09 having the same diameter D3 and one hole pattern P07 having a relatively large diameter D4. FIG. 6A shows that the diameter D4 of the eighth hole pattern P07 among the second group of hole patterns P00 to P09 is larger than the diameter D3 of each of the remaining hole patterns P00 to P06, P08, and P09. Assuming that it means "0" to "9" sequentially from the first hole pattern P00 to the last hole pattern P09 in the second group of hole patterns P00 to P09, it may be seen that the second group of hole patterns P00 to P09 has information in which the number in the unit place of N is "7".

That is, the coordinate pattern CRP shown in FIG. 6A may be a coordinate pattern in the seventh unit detection area. Through the position of the hole pattern having a different size from the adjacent hole pattern among the hole patterns P00 to P19 included in the coordinate pattern CRP, the user may easily obtain the coordinate information of the corresponding unit detection area.

The coordinate pattern CRP1 shown in FIG. 6B may be disposed in a unit detection area at a different position from the unit detection area shown in FIG. 6A. That is, the coordinate pattern CRP1 shown in FIG. 6B includes different coordinate information from the coordinate pattern CRP shown in FIG. 6A.

Specifically, referring to FIG. 6B, it is shown that the second hole pattern P11 of the first group of hole patterns P10 to P19 has a relatively larger diameter than the remaining hole patterns P10 and P12 to P19. To correspond to that shown in FIG. 6A, the eighth hole pattern P07 of the second group of hole patterns P00 to P09 has a larger diameter than the remaining hole patterns P00 to P06, P08, and P09.

In the coordinate pattern CRP1 shown in FIG. 6B, the first group of hole patterns P10 to P19 represent information that the number in tens place of N is "1" and the second group of hole patterns P00 to P09 represent information that the number in the unit place of N is "7". That is, the coordinate pattern CRP1 may be the coordinate pattern of the "17th" unit detection area.

According to the inventive concepts, coordinate information of a corresponding unit detection area may be easily obtained through the position of a pattern having a different size from adjacent patterns. At this time, the size of the pattern may have a size difference that may be distinguished from adjacent patterns through the naked eye.

For example, as shown in FIG. 6C, the first pattern P1 and the second pattern P2 may have a circular shape having radii R1 and R2 different from each other about the same center point CTP. The first pattern P1 may have a circular shape with the first radius R1 and the second pattern P2 may have the circular shape with the second radius R2.

In FIGS. 6A and 6B, for ease of explanation, hole patterns including coordinate information are shown as a second pattern P2 and adjacent remaining hole patterns are shown as a first pattern P1. However, these are mere examples, and the hole patterns including the coordinate information may be shown as the second pattern P2, and adjacent remaining hole patterns may be shown as the first pattern P1, but are not limited to any one specific exemplary embodiment.

In the present exemplary embodiment, the first pattern P1 and the second pattern P2 may have a similar relationship with each other. That is, if the first pattern P1 is enlarged at a certain ratio, it may be a shape that is in congruence with the second pattern P2. Conversely, when the second pattern P2 is reduced in a constant ratio, it may be a shape that is in congruence with the first pattern P1.

The difference between the first radius R1 and the second radius R2 is visually distinguishable. If the difference between the first radius R1 and the second radius R2 is excessively fine, a separate measuring instrument is required, which may increase the inspection process time or increase the cost.

On the other hand, as the difference between the first radius R1 and the second radius R2 becomes greater, it is easy to distinguish by the naked eye, but it may be recognized as fault or defect in optical inspection. Further, the area occupied by the coordinate pattern CRP or CRP1 may be increased, so that the degree of freedom of arrangement of the coordinate patterns may be reduced.

According to the inventive concepts, the difference between the first radius R1 and the second radius R2 may be less than about 1 μm. In this case, the difference from the adjacent pattern may be easily identified and it may not be interpreted as a defect in an optical inspection using the automatic optical inspection equipment, so that it is possible to stably function as a coordinate pattern including coordinate information.

Figure 7A:
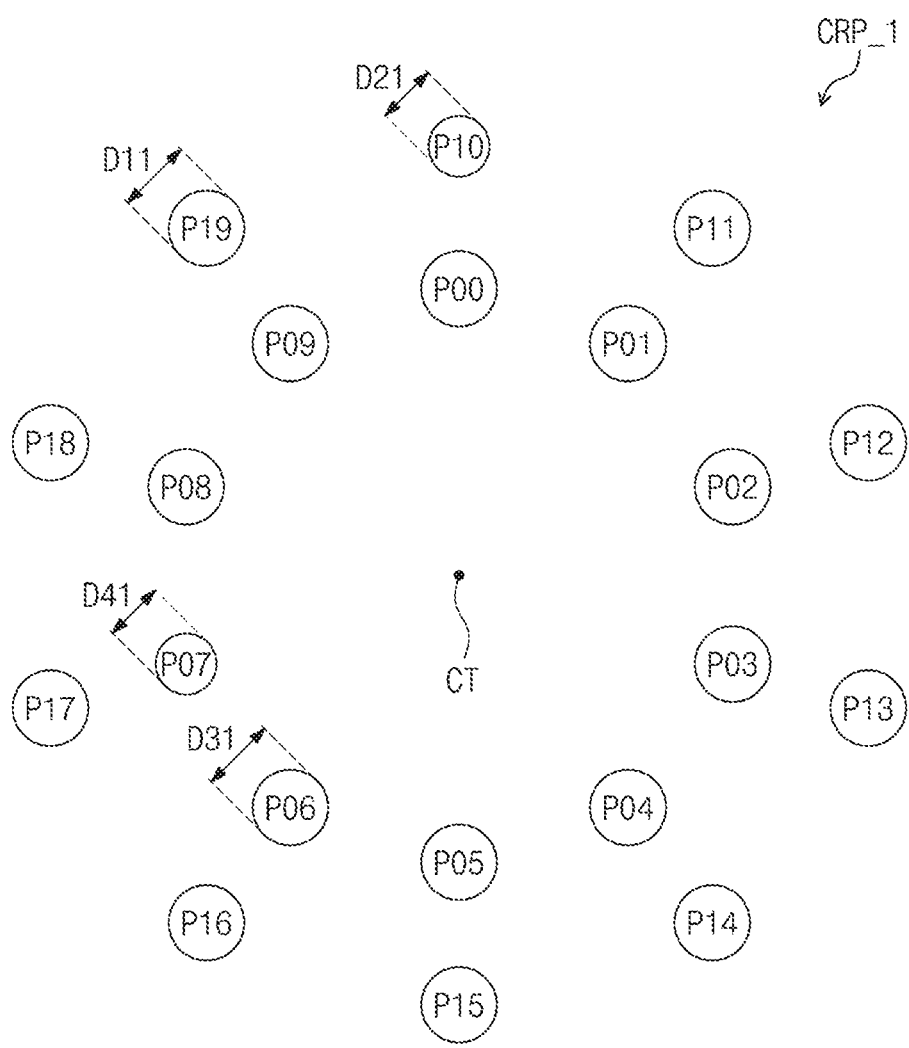
FIGS. 7A and 7B are plan views of coordinate patterns according to an exemplary embodiment of the present invention.
Figure 7B:
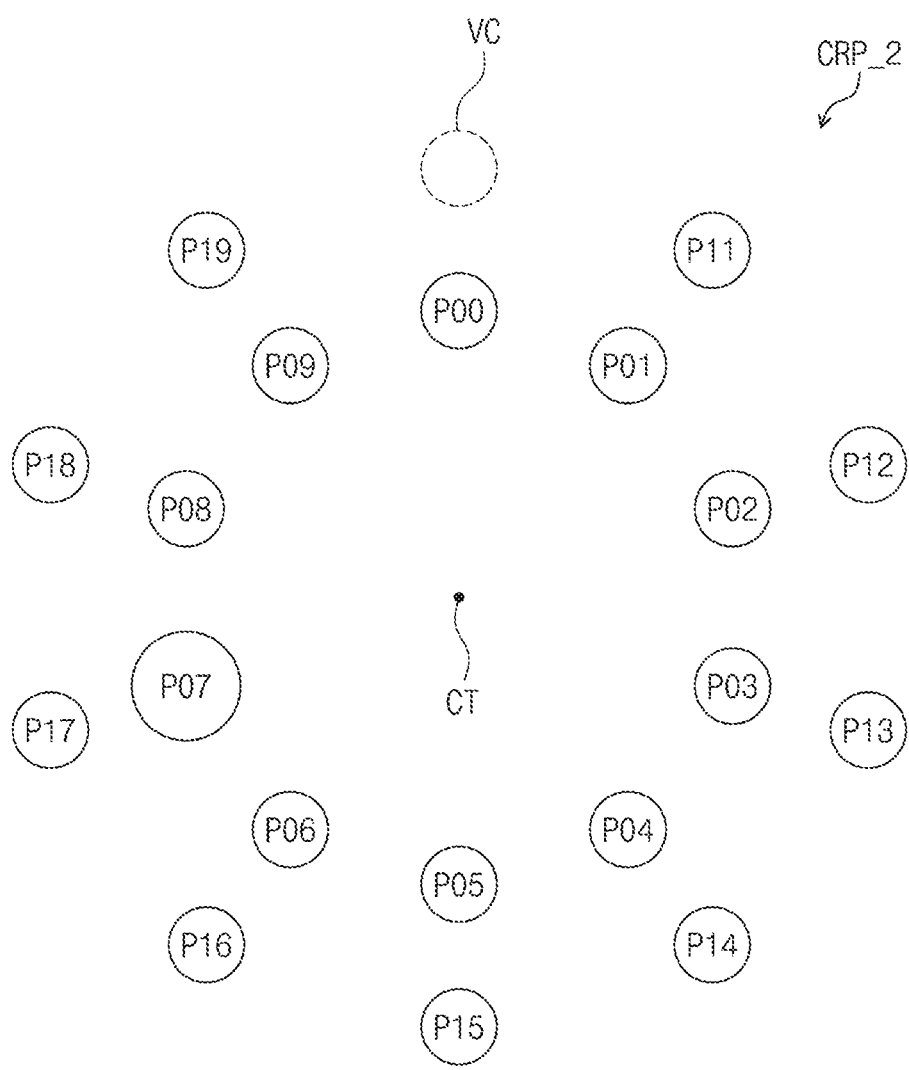

FIGS. 7A and 7B are plan views of coordinate patterns according to an exemplary embodiment of the present invention. FIGS. 7A and 7B illustrate exemplary embodiments of the coordinate patterns CRP_1 and CRP_2 in the seventh unit detection area for ease of illustration, respectively, and may be unit detection areas corresponding to FIG. 6A. Hereinafter, the inventive concepts will be described with reference to FIGS. 7A and 7B. The same components as those described with reference to FIGS. 1A to 6C are given by the same reference numerals and redundant description will be omitted.

As shown in FIG. 7A, in the coordinate pattern CRP_1, the first group of hole patterns P10 to P19, which mean the "tens" place in the coordinate information of the unit detection area, may include nine hole patterns P11 to P19 having the same diameter D11 and one hole pattern P10 having a relatively small diameter D21. In addition, the second group of hole patterns P00 to P09, which mean the "unit" place in the coordinate information of the unit detection area, may include nine hole patterns P00 to P06, P08 and P09 having the same diameter D31 and one hole pattern P07 having a relatively small diameter D41.

The hole patterns P10 and P07 having a relatively small size may be similar to the remaining hole patterns P11 to P19, P00 to P06, P08 and P09. The size difference between the hole patterns may be about 2 μm or less.

That is, in the coordinate pattern CRP_1, the hole pattern distinguished from adjacent hole patterns may have a relatively small size. Through the positions of the hole patterns P10 and P07 having a smaller size than the adjacent hole patterns, the coordinate pattern CRP_1 may provide coordinate information that the corresponding unit detection area corresponds to the "seventh unit detection area".

Alternatively, as shown in FIG. 7B, in the coordinate pattern CRP_2, the first group of hole patterns P11 to P19, which means the "tens" place of the coordinate information of the corresponding unit detection area, may be composed of only nine hole patterns P11 to P19. At this time, the first hole pattern P10 shown in FIG. 7A may be omitted and provided as an empty space VC. If there is no hole pattern with a different size among the nine hole patterns P11 to P19, it may be defined that the tens place in the coordinate information of the corresponding detection area may mean "0". Through the positions of the hole patterns P07 having a relatively smaller size than the adjacent hole patterns, the coordinate pattern CRP_2 may provide coordinate information that the corresponding unit detection area corresponds to the "seventh unit detection area".

According to the inventive concept, various types of coordinate patterns CRP_1 and CRP_2 may be provided for the same detection area. Although not shown in the drawing, if the total number of unit detection areas provided in the electronic panel is more than 100, the coordinate patterns CRP_1 and CRP_2 may further include a third group of hole patterns. According to the inventive concept, if the coordinate information may be visually recognized through a size difference between a plurality of hole patterns having a similar relationship with each other, the coordinate patterns CRP_1 and CRP_2 may be provided in various arrangements and various shapes, and are not limited to any one specific exemplary embodiment.

FIGS. 8A to 8D are plan views of coordinate patterns according to an exemplary embodiment of the present invention. FIGS. 8A to 8D illustrate exemplary embodiments of the coordinate patterns CRP_3, CRP_4, CRP_5, and CRP_6 in the seventh unit detection area for ease of illustration, respectively, and may be unit detection areas corresponding to FIG. 6A. Hereinafter, the inventive concept will be described with reference to FIGS. 8A to 8D. Moreover, the same components as those described with reference to FIGS. 1A to 7B are given by the same reference numerals and any redundant description will be omitted.

Figure 8A:
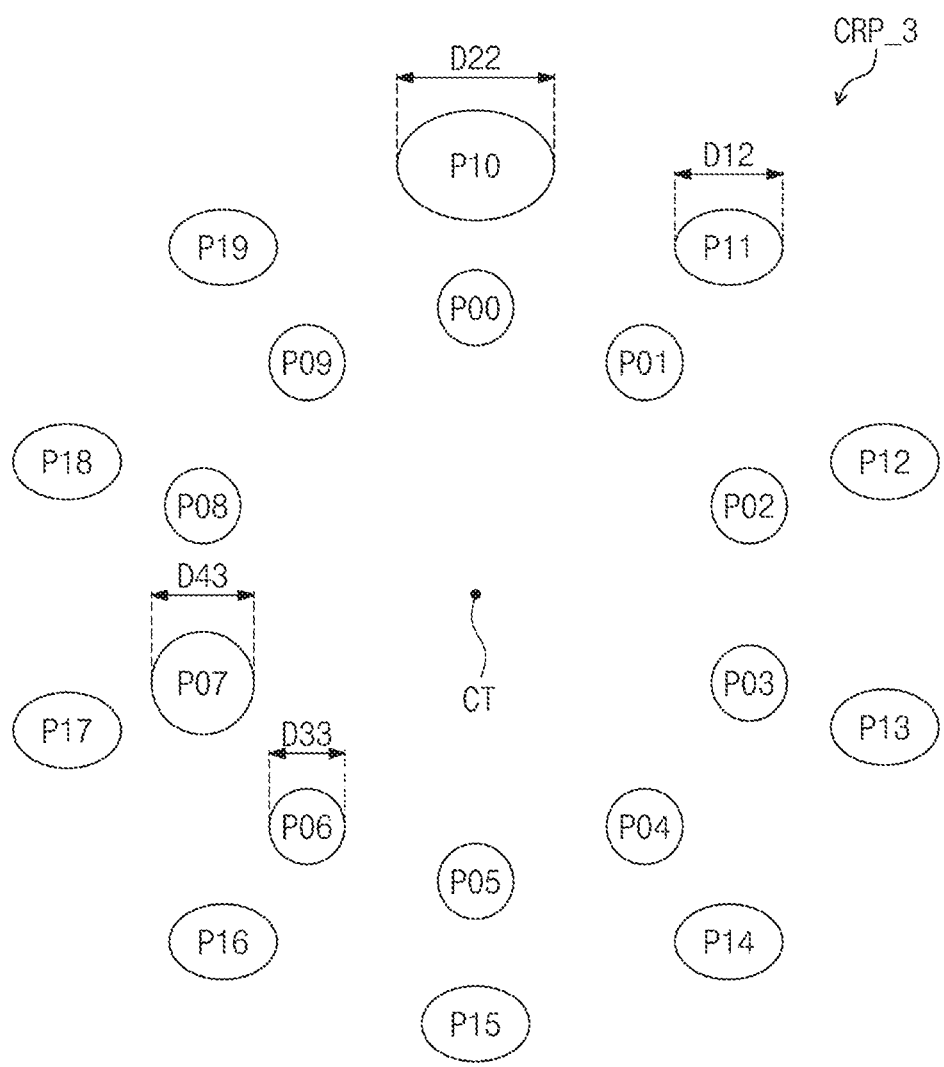
FIGS. 8A, 8B, 8C, and 8D are plan views of coordinate patterns according to an exemplary embodiment of the present invention.

As shown in FIG. 8A, the first group of hole patterns P10 to P19 and the second group of hole patterns P00 to P09 may have different shapes. In this exemplary embodiment, each of the first group of hole patterns P10 to P19 may have an elliptical shape. The first group of hole patterns P10 to P19 may include nine hole patterns P11 to P19 having the same long side D12 and one hole pattern P10 having a relatively large long side D22. The first hole pattern P10 and the remaining hole patterns P11 to P19 have a similar relationship.

In this exemplary embodiment, each of the second group of hole patterns P00 to P09 may have a circular shape. The second group of hole patterns P00 to P09 may include nine hole patterns P00 to P06, P08 and P09 having the same diameter D32 and one hole pattern P07 having a relatively large diameter D42. The eighth hole pattern P07 and the remaining hole patterns P00 to P06, P08 and P09 have a similar relationship. Through the positions of the hole patterns P10 and P07 having a larger size than the adjacent hole patterns, the coordinate pattern CRP_3 may provide coordinate information that the corresponding unit detection area corresponds to the "seventh unit detection area".

In the coordinate pattern CRP_3, the hole pattern distinguished from adjacent hole patterns may have a relatively large size. On the other hand, the hole patterns belonging to different groups may have different shapes from each other. Accordingly, the distinction between the first group of hole patterns P10 to P19 and the second group of hole patterns P00 to P09 becomes easier and the discrimination power of the coordinate pattern CRP_3 may be improved.

Figure 8B:
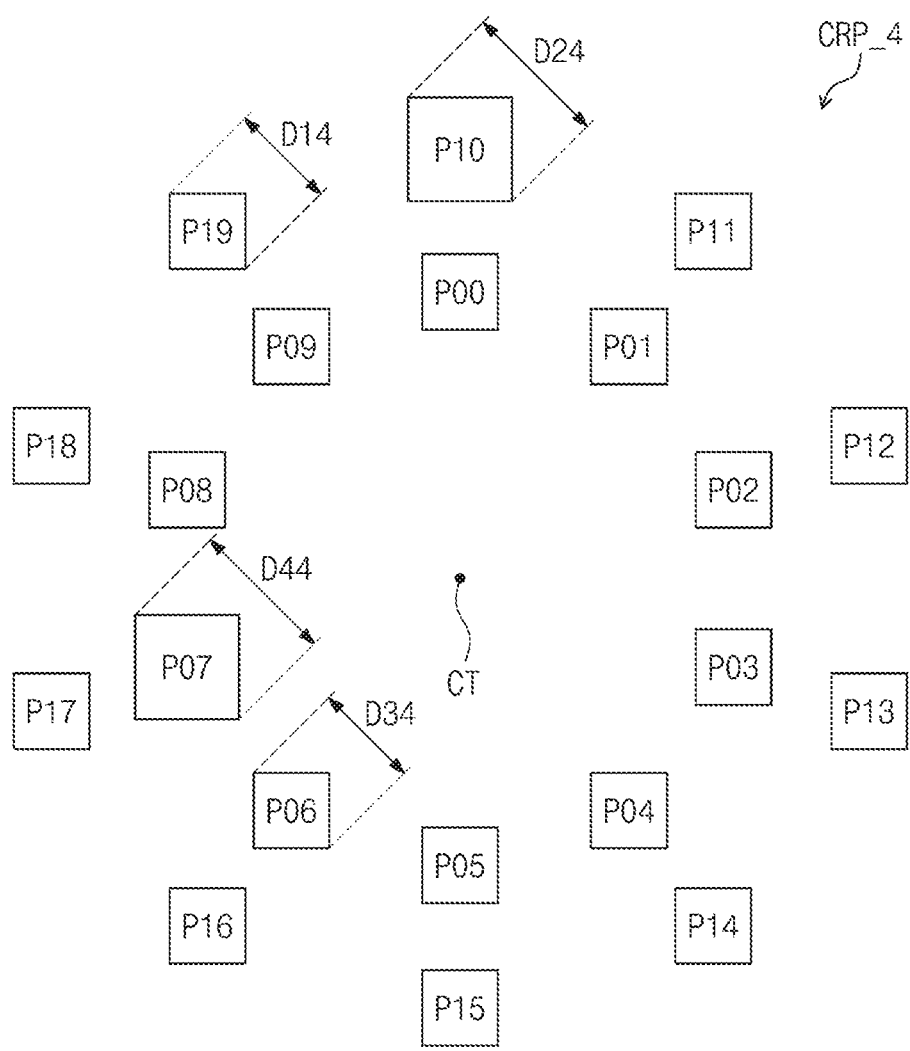

As shown in FIG. 8B, the coordinate pattern CRP_4 may include hole patterns of polygonal shape. In this exemplary embodiment, each of the first group of hole patterns P10 to P19 and the second group of hole patterns P00 to P09 may be shown in a rectangular shape.

The first group of hole patterns P10 to P19 may include nine hole patterns P11 to P19 having the same diagonal line D14 and one hole pattern P10 having a relatively large diagonal line D24. The first hole pattern P10 and the remaining hole patterns P11 to P19 have a similar relationship.

The second group of hole patterns P00 to P09 may include nine hole patterns P00 to P06, P08 and P09 having the same diagonal line D34 and one hole pattern P07 having a relatively large diagonal line D44. The eighth hole pattern P07 and the remaining hole patterns P00 to P06, P08, and P09 have a similar relationship. Through the positions of the hole patterns P10 and P07 having a relatively larger size than the adjacent hole patterns, the coordinate pattern CRP_3 may provide coordinate information that the corresponding unit detection area corresponds to the "seventh unit detection area".

Figure 8C:
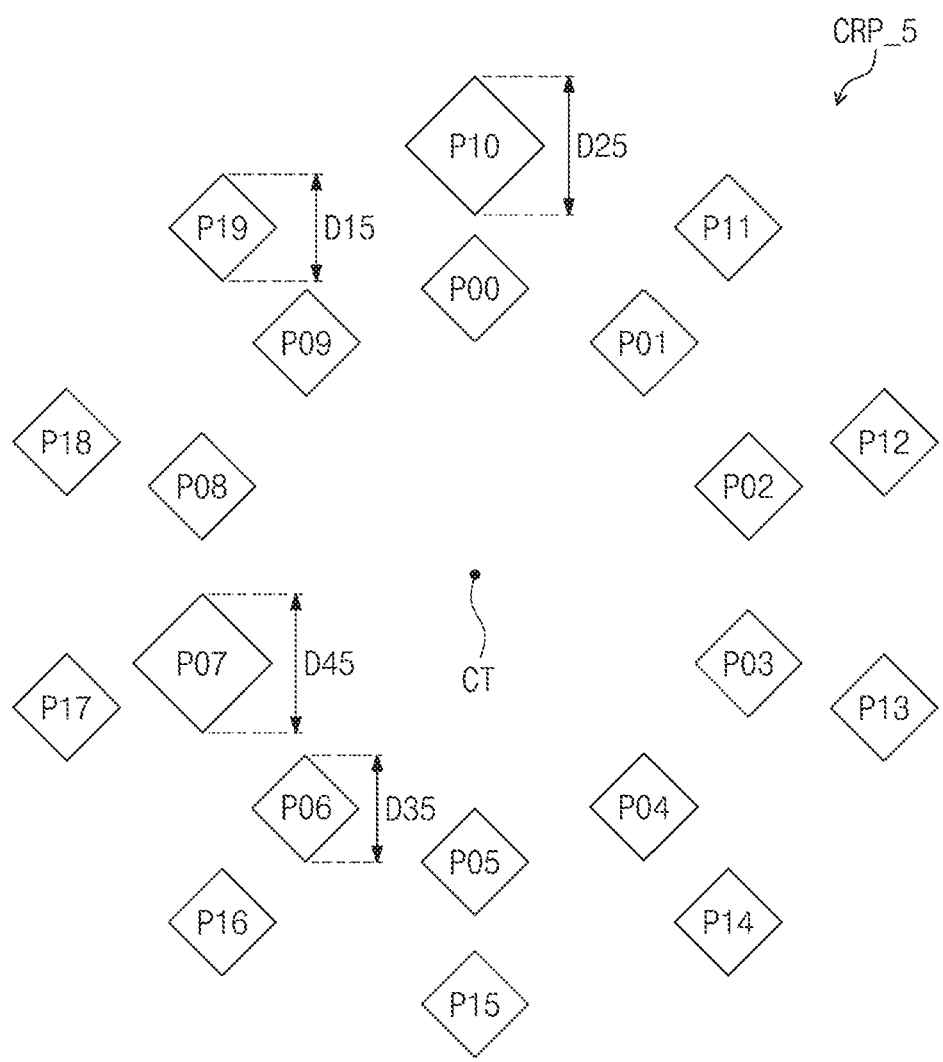

Alternatively, as shown in FIG. 8C, the coordinate pattern CRP_5 may include rhombic hole patterns. The first group of hole patterns P10 to P19 may include nine hole patterns P11 to P19 having the same diagonal line D15 and one hole pattern P10 having a relatively large diagonal line D25. The first hole pattern P10 and the remaining hole patterns P11 to P19 have a similar relationship.

The second group of hole patterns P00 to P09 may include nine hole patterns P00 to P06, P08 and P09 having the same diagonal line D35 and one hole pattern P07 having a relatively large diagonal line D45. The eighth hole pattern P07 and the remaining hole patterns P00 to P06, P08 and P09 have a similar relationship. Through the positions of the hole patterns P10 and P07 having a relatively larger size than the adjacent hole patterns, the coordinate pattern CRP_5 may provide coordinate information that the corresponding unit detection area corresponds to the "seventh unit detection area".

Figure 8D:
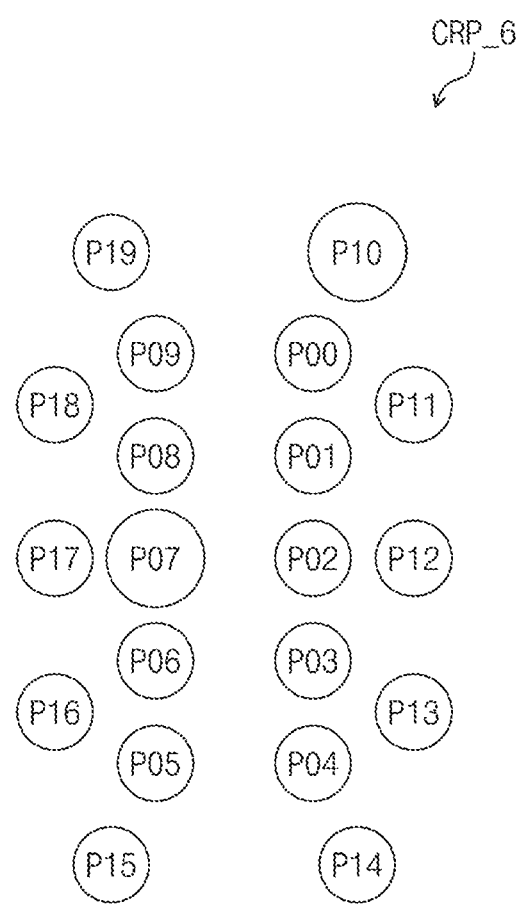

Alternatively, as shown in FIG. 8D, in the coordinate pattern CRP_6, the arrangement of the hole patterns may be variously provided. In this exemplary embodiment, the first group of hole patterns P10 to P19 may be arranged in an elliptical shape having long sides extending in the vertical direction. In addition, the second group of hole patterns P00 to P09 may be arranged in a rectangular shape extending in the vertical direction. Through the positions of the hole patterns P10 and P07 having a larger size than the adjacent hole patterns, the coordinate pattern CRP_6 may provide coordinate information that the corresponding unit detection area corresponds to the "seventh unit detection area".

According to the inventive concepts, if the coordinate information of the corresponding unit detection area may be provided through the arrangement of the patterns having a similar shape, the coordinate patterns CRP_3, CRP_4, CRP_5, and CRP_6 may include hole patterns having various shapes, or may include hole patterns arranged in various shapes, and are not limited to any one embodiment.

Figure 9A:
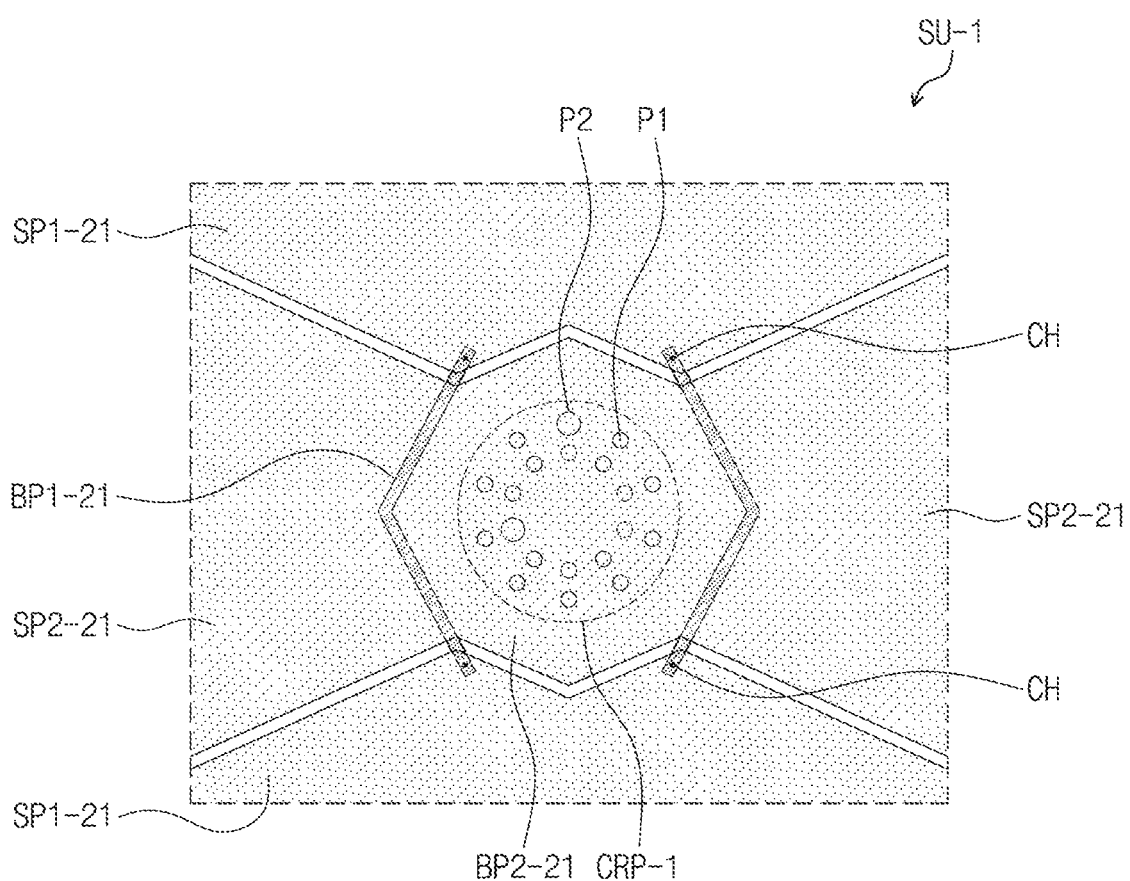
FIGS. 9A and 9B are plan views showing a portion of unit detection areas according to an exemplary embodiment of the present invention.
Figure 9B:
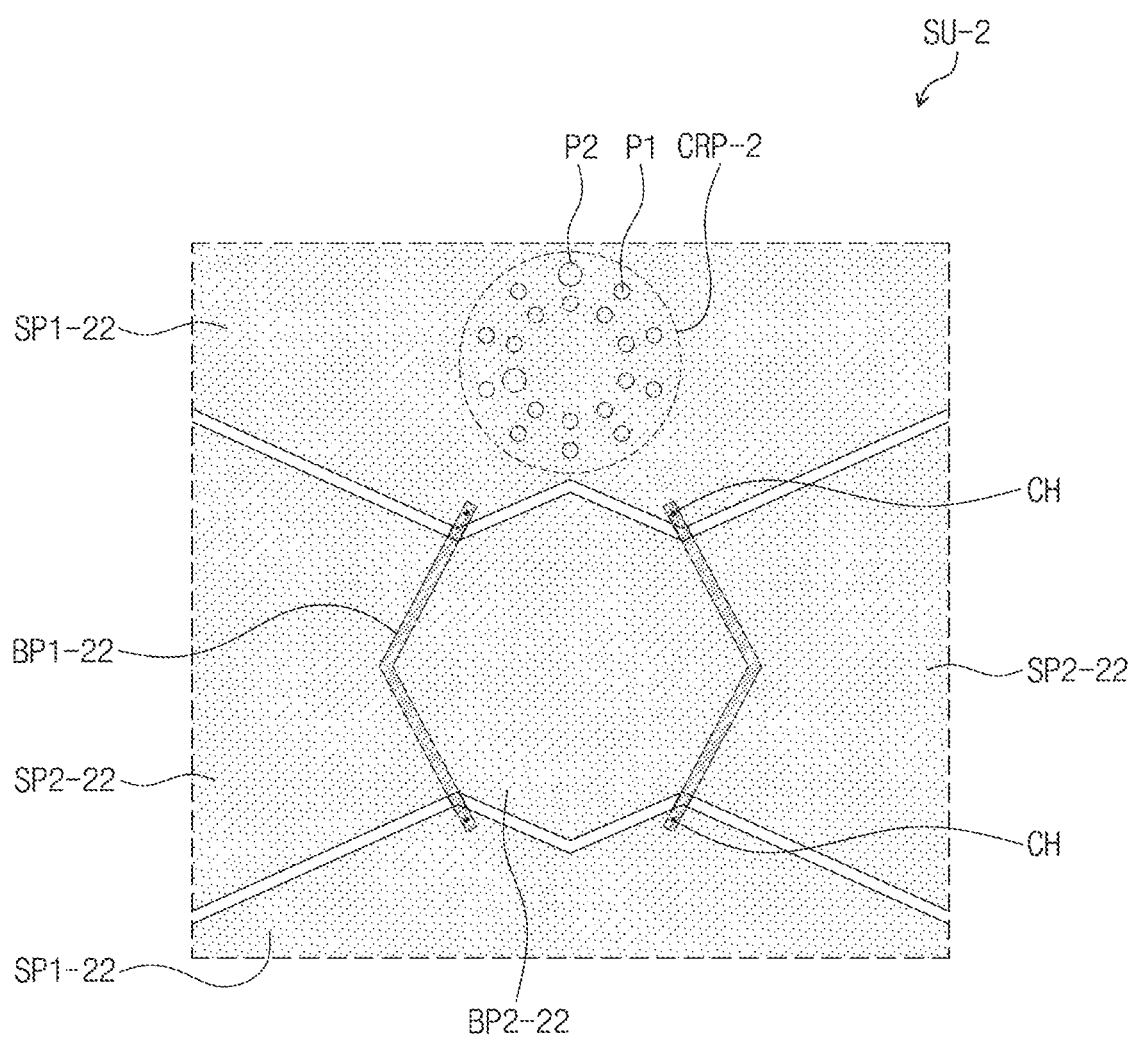

FIGS. 9A and 9B are plan views showing a portion of unit detection areas according to an exemplary embodiment of the present invention. FIGS. 9A and 9B show areas corresponding to FIG. 3B for ease of explanation. Hereinafter, the inventive concepts will be described with reference to FIGS. 9A and 9B. Moreover, the same components as those described with reference to FIGS. 1A to 8D are given by the same reference numerals and redundant description will be omitted.

As shown in FIG. 9A, in the electronic panel according to this exemplary embodiment of the present invention, the island part B3 (see FIG. 3B) may be omitted. The electronic panel includes first main patterns SP1-21, second main patterns SP2-21, a first connection pattern BP1-21, a second connection pattern BP2-21, and a coordinate pattern CRP-1. The first connection pattern BP1-21 is disposed on a different layer from the first main patterns SP1-21, the second main patterns SP2-21, and the second connection pattern BP2-21, and is connected to the first main patterns SP1-21 through the contact hole CH. In this exemplary embodiment, the first connection pattern BP1-21 may correspond to the integral shape formed when the first connection part B1 (see FIG. 3B) and the second connection part B2 (see FIG. 3B) are connected.

The coordinate pattern CRP-1 may be disposed to overlap with the second connection pattern BP2-21. As described above, the coordinate pattern CRP-1 may be defined through the second connection pattern BP2-21 or through the detection insulating layer IL (see FIG. 4A).

The coordinate pattern CRP-1 includes a first pattern P1 and a second pattern P2 which is similar to the first pattern P1. Referring to the coordinate pattern CRP-1, the unit detection area SU-1 may correspond to the "seventh detection area".

Alternatively, as shown in FIG. 9B, the electronic panel includes first main patterns SP1-22, second main patterns SP2-22, a first connection pattern BP1-22, a second connection pattern BP2-22, and a coordinate pattern CRP-2. The first main patterns SP1-22, the second main patterns SP2-22, the first connection pattern BP1-22, and the second connection pattern BP2-22 correspond to the first main patterns SP1-21, the second main patterns SP2-21, the first connection pattern BP1-21, and the second connection pattern BP2-21, which are shown in FIG. 9A, respectively.

The coordinate pattern CRP-2 according to this exemplary embodiment may be disposed overlapping with any one of the first main patterns SP1-22. The unit detection area SU-2 includes a coordinate pattern CRP-2 defined at a position substantially different from the detection area SU-1 shown in FIG. 9A, but may include the same coordinate information.

According to the inventive concepts, the coordinate patterns CRP-1 and CRP-2 may be provided at various positions within the unit detection areas SU-1 and SU-2 and are not limited to any one specific exemplary embodiment. Accordingly, the position of the unit detection area may be easily grasped within the unit detection area, so that the inspection process may be simplified and the process time may be shortened.

Figure 10A:
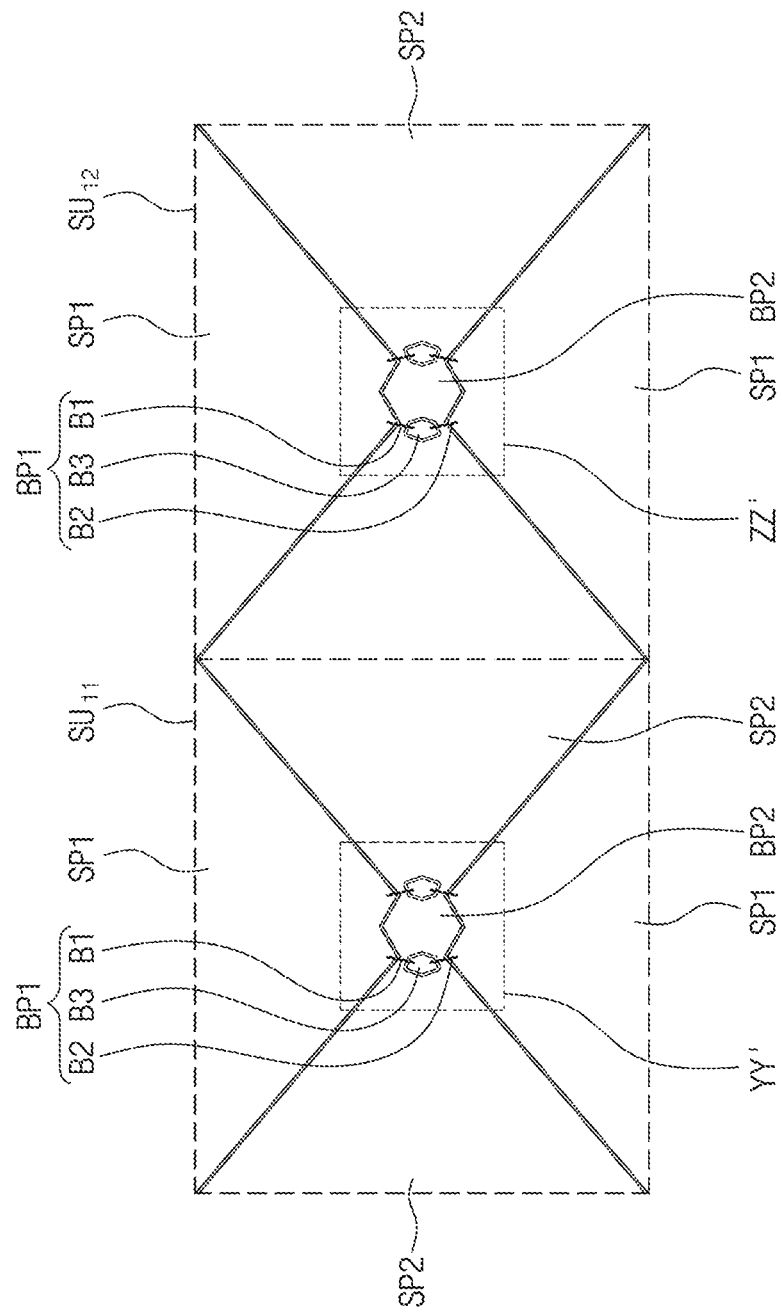
FIG. 10A is a plan view showing a partial area of an electronic panel according to an exemplary embodiment of the present invention.
Figure 10B:
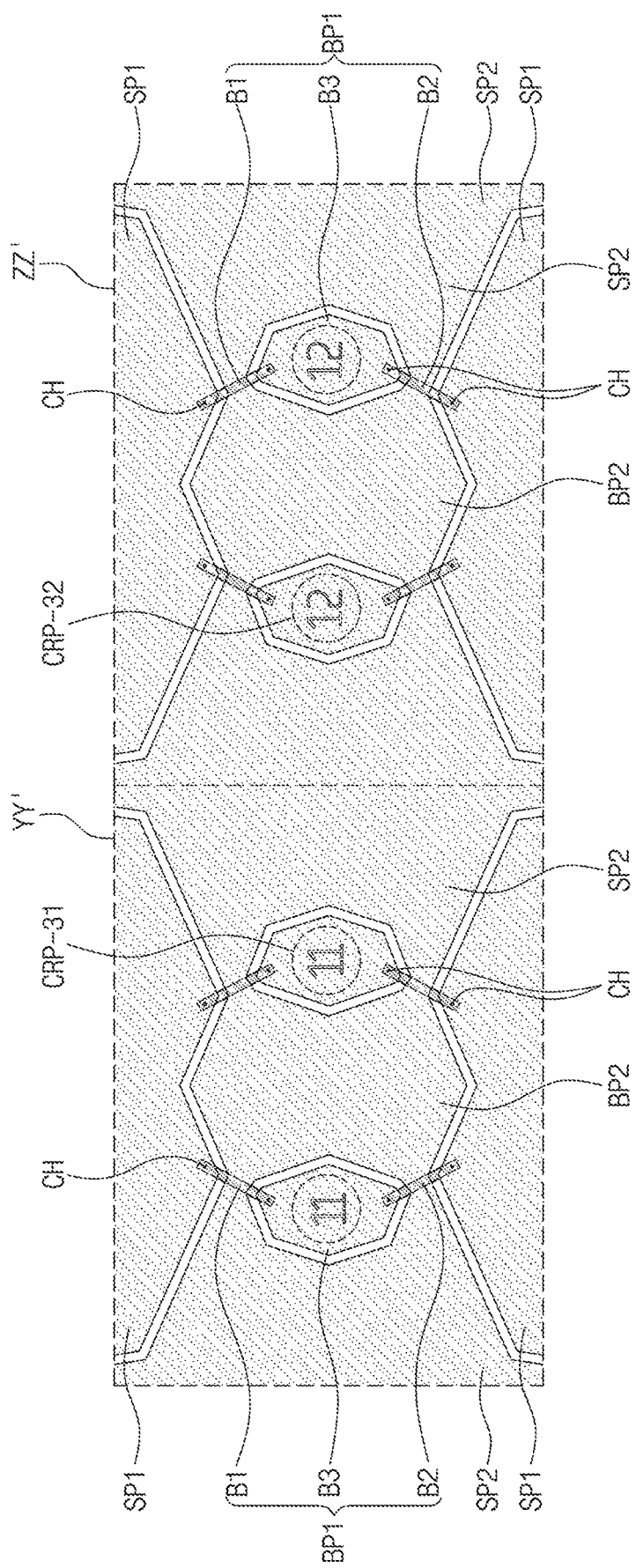
FIG. 10B is a plan view showing an enlarged partial area shown in FIG. 10A.
Figure 10C:
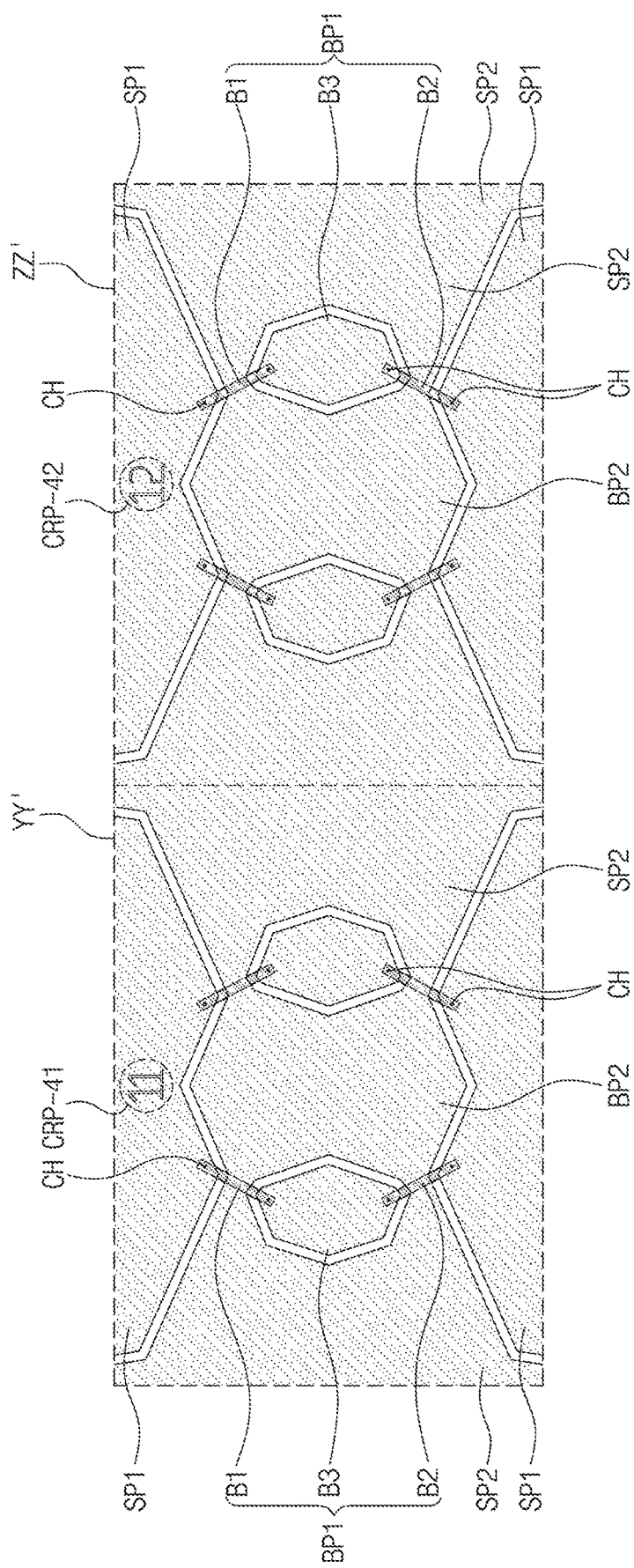
FIG. 10C is an enlarged partial plan view of an electronic panel according to an exemplary embodiment of the present invention.

FIG. 10A is a plan view showing a partial area of an electronic panel according to an exemplary embodiment of the present invention. FIG. 10B is a plan view showing an enlarged partial area shown in FIG. 10A. FIG. 10C is an enlarged partial plan view of an electronic panel according to an exemplary embodiment of the present invention. FIG. 10A shows an eleventh unit detection area $SU_{11}$ and a twelfth unit detection area $SU_{12}$ which are adjacent to each other. FIG. 10B shows the XX' area and the YY' area shown in FIG. 10A together, and FIG. 10C shows an area corresponding to FIG. 10B. Hereinafter, the inventive concepts will be described with reference to FIGS. 10A to 10C. Moreover, the same components as those described with reference to FIGS. 1A to 9B are given by the same reference numerals and any redundant description will be omitted.

As shown in FIG. 10A, based on the first connection pattern CP1 and the second connection pattern CP2, a portion that is a half of the areas of the first main patterns SP1 and a half of the areas of the second main patterns SP2 may be disposed in each of the unit detection areas $SU_{11}$ and $SU_{12}$. In FIG. 10A, the boundary between the unit detection areas $SU_{11}$ and $SU_{12}$ is illustratively shown as passing through the center of one second main pattern SP2.

Referring to FIG. 10B, the coordinate patterns CRP-31 and CRP-32 are disposed in the first unit detection area $SU_{11}$ and the second unit detection area $SU_{12}$, respectively, so that they may provide coordinate information of the first unit detection area $SU_{11}$ and the second unit detection area $SU_{12}$, respectively. At this time, each of the coordinate patterns CRP-31 and CRP-32 may have a numerical shape.

Specifically, the coordinate pattern CRP-31 of the first unit detection area has the shape of the number "11". The coordinate pattern CRP-31 of the first unit detection area may be disposed on the island part B3 of the first unit detection area $SU_{11}$. Correspondingly, the coordinate pattern CRP-32 of the second unit detection area has the shape of the number "12". The coordinate pattern CRP-32 of the second unit detection area may be disposed on the island part B3 of the first unit detection area $SU_{12}$. According to the inventive concept, through the shape of the coordinate detection patterns CRP-31 and CRP-32 arranged on the island part B3, it may be easily recognized whether the corresponding unit detection area is the first unit detection area $SU_{11}$ or the second unit detection area $SU_{12}$.

Alternatively, referring to FIG. 10C, the coordinate patterns CRP-41 and CRP-42 may be disposed on the first main patterns SP1 of the first unit detection area $SU_{11}$ and the second unit detection area $SU_{12}$. The coordinate patterns CRP-41 and CRP-42 may have a numerical shape like the coordinate patterns CRP-31 and CRP-32 shown in FIG. 10B. According to the inventive concepts, through the shape of the coordinate detection patterns CRP-41 and CRP-42 arranged on the first main patterns SP1, it may be easily recognized whether the corresponding unit detection area is the first unit detection area $SU_{11}$ or the second unit detection area $SU_{12}$.

As shown in FIGS. 10A to 10C, the coordinate patterns CRP-31, CRP-32, CRP-41, and CRP-42 may have a numerical shape and if they are disposed in the unit detection areas $SU_{11}$ and $SU_{12}$, they may be disposed at any position in the connection patterns BP1 and BP2 and the main patterns SP1 and SP2. As the coordinate patterns CRP-31, CRP-32, CRP-41, and CRP-42 disposed in each of the unit detection areas $SU_{11}$ and $SU_{12}$ have a numerical shape, the visibility of each coordinate information may be increased. According to the inventive concepts, in a process in which inspection such as automatic optical inspection (AOI) is not performed or the previous process thereof, the position of the corresponding unit detection area may be easily determined. Thus, the inspection process of the electronic panel may be simplified.

Figure 11:
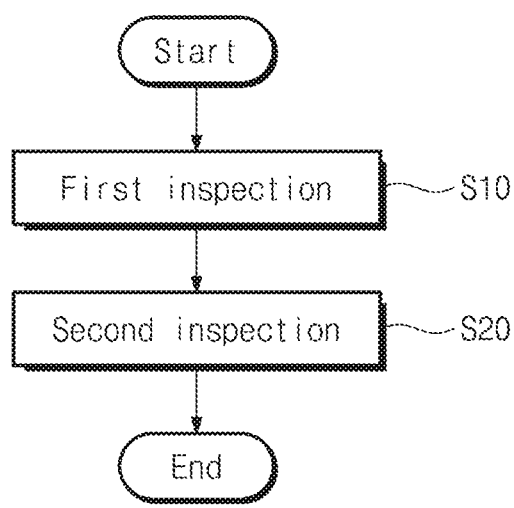
FIG. 11 is a flowchart illustrating an electronic device testing method according to an exemplary embodiment of the present invention.

FIG. 11 is a flowchart illustrating an electronic device inspection method according to an exemplary embodiment of the present invention. As shown in FIG. 11, the electronic device inspection method according to the inventive concepts may include a first inspection operation S10 and a second inspection operation S20.

The first inspection operation S10 may be an optical inspection operation. The first inspection operation S10 may include Automatic Optical Inspection ("AOI"). In the first inspection operation S10, the appearance of the electronic panel is inspected, and it is determined whether there is foreign matter or whether the patterns constituting the detection electrode are abnormal.

The second inspection operation S20 may be an electrical inspection operation. The second inspection operation S20 may include an inspection to confirm that normal operation is performed by applying an electrical signal to the electronic panel. In the second inspection operation S20, electrical characteristics may be evaluated for each unit detection area.

At this time, in the case of unit detection area where abnormal operation occurs, an operation of inspecting the unit detection area may be performed to determine whether a defect occurs and to obtain the cause of the defect. The user enlarges the unit detection area through a magnifying glass or the like to determine whether the unit detection area is defective. At this time, the user may easily obtain the coordinate information of the corresponding unit detection area through the coordinate pattern CRP (see FIG. 3A). Accordingly, the time of inspection operation may be reduced and the inspection operation may be simplified.

On the other hand, the pattern size difference in the coordinate pattern CRP may not be identified by the optical inspection equipment used in the first inspection operation S10. Thus, even if different coordinate patterns are provided for each of the unit detection areas, they may not be detected as defective in the first inspection operation S10. Therefore, the stability of the inspection operation may be improved.

According to the inventive concepts, the inspection process and the like of the electronic panel may be simplified and the process time may be shortened.

Further, according to the inventive concept, since coordinate patterns may not be interpreted as defective in optical inspection using automatic optical inspection equipment, it is possible to stably provide the coordinate information of the unit detection area in various inspection processes.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic panel comprising:
   a base substrate including an unit detection area;
   a first detection electrode disposed in the unit detection area and including a pair of first main patterns arranged in a first direction and a first connection pattern extending along the first direction, the pair of first main patterns are connected to a first end of the first connection pattern and a second end of the first connection pattern oppositely located to the first end of the first connection pattern;
   a second detection electrode disposed in the unit detection area and including a pair of second main patterns arranged in a second direction crossing the first direction and a second connection pattern extending along the second direction, the pair of second main patterns are connected to a first end of the second connection pattern and a second end of the second connection pattern oppositely located to the first end of the second connection pattern; and
   a coordinate pattern disposed in the unit detection area,
   wherein the coordinate pattern comprises:
      a first pattern having a first size; and
      a second pattern spaced apart from the first pattern and having a second size different from the first size, and
   wherein the first pattern resembles the second pattern.

2. The electronic panel of claim 1, wherein a difference between a maximum diagonal length of the first pattern and a maximum diagonal length of the second pattern is less than or equal to 2 μm.

3. The electronic panel of claim 1, wherein:
   the first connection pattern and the second connection pattern are spaced apart from each other with an insulating layer therebetween; and
   the first pattern and the second pattern comprise a plurality of through-holes passing through the insulating layer.

4. The electronic panel of claim 3, wherein:
   the first connection pattern comprises:
      a first connection part disposed on a different layer from the second connection pattern;
      a second connection part disposed on a different layer from the second connection pattern and spaced apart from the first connection part; and an island part disposed between the first connection part and the second connection part and disposed on the same layer as the second connection pattern and spaced apart from the second connection pattern in a plan view; and each of the first connection part and the second connection part is connected to the island part through the insulating layer.

5. The electronic panel of claim 4, wherein the island part is disposed in an opening part passing through the second connection pattern or the second main pattern, and is spaced apart from the second connection pattern or the second main pattern in a plan view.

6. The electronic panel of claim 4, wherein the coordinate pattern is disposed on the island part.

7. The electronic panel of claim 5, wherein the first and second connection parts and the island part comprise different materials from each other.

8. The electronic panel of claim 1, wherein the first pattern and the second pattern comprise through-holes passing through any one of the first connection pattern, the second connection pattern, the pair of first main patterns, and the pair of second main patterns.

9. The electronic panel of claim 1, wherein:

the coordinate pattern comprises:

a first group of hole patterns including a plurality of hole patterns spaced apart from each other along one direction; and a second group of hole patterns spaced apart from each other in a direction different from the one direction and spaced apart from the first group of hole patterns, wherein the first pattern is provided in plurality and one of the first group of hole patterns comprises the second pattern and the remaining of the first group of hole patterns comprises the plurality of first patterns.

10. The electronic panel of claim 9, wherein the first group of hole patterns surrounds the second group of hole patterns.

11. The electronic panel of claim 9, wherein the first group of hole patterns has different shapes from shapes of the second group of hole patterns.

12. The electronic panel of claim 9, wherein the first group of hole patterns has different sizes from sizes of the second group of hole patterns.

13. The electronic panel of claim 9, wherein the number of the first group of hole patterns and the number of the second group of hole patterns are different from each other.

14. The electronic panel of claim 1, wherein the unit detection area is provided in plurality and the positions of the second patterns in the plurality of unit detection areas are different from each other.

15. An electronic panel comprising:

a first detection electrode including a first connection pattern, and a plurality of first main electrodes spaced apart from each other with the first connection pattern therebetween and connected to the first connection pattern;

a second detection electrode including a second connection pattern spaced apart from the first connection pattern with an insulating layer therebetween, and a plurality of second main patterns spaced apart from each other with the second connection pattern therebetween and connected to the second connection pattern; and a coordinate pattern disposed on the first detection electrode, wherein:

the first connection pattern comprises an island part spaced apart from the first main patterns, a first connection part connecting one of the first main patterns and the island part, and a second connection part connecting another of the first main patterns and the island part; and the coordinate pattern is disposed on the island part.

16. The electronic panel of claim 15, wherein the island part is disposed on the same layer as the second detection electrodes and spaced apart from the second connection patterns and the second main patterns in a plan view.

17. The electronic panel of claim 15, wherein:

the coordinate pattern comprises:

a plurality of first patterns, each having a first size; and a second pattern spaced apart from the first patterns and having a second size different from the first size; and each of the first patterns resembles the second pattern.

18. The electronic panel of claim 15, wherein:

the coordinate pattern comprises a plurality of through-holes passing through the insulating layer; and the island part has an upper surface curved along the through-holes.

19. The electronic panel of claim 15, wherein the coordinate pattern comprises a plurality of through-holes passing through the island part.

20. The electronic panel of claim 15, wherein the coordinate pattern has different numerical shapes from each other.

* * * * *